(12) United States Patent
Hu

(10) Patent No.: US 10,986,573 B2
(45) Date of Patent: Apr. 20, 2021

(54) BLUETOOTH MESH NETWORK GATEWAY AND DEVICE DATA COMMUNICATION

(71) Applicant: Alibaba Group Holding Limited, George Town (KY)

(72) Inventor: Junfeng Hu, Hangzhou (CN)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 16/440,516

(22) Filed: Jun. 13, 2019

(65) Prior Publication Data
US 2019/0394725 A1 Dec. 26, 2019

(30) Foreign Application Priority Data
Jun. 22, 2018 (CN) .......................... 201810654229.5

(51) Int. Cl.
*H04W 52/02* (2009.01)
*H04W 88/16* (2009.01)
*H04W 4/80* (2018.01)
*H04W 84/18* (2009.01)

(52) U.S. Cl.
CPC ......... *H04W 52/0216* (2013.01); *H04W 4/80* (2018.02); *H04W 52/0206* (2013.01); *H04W 88/16* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 8,035,479 B2 | 10/2011 | Tran | |
| 8,514,758 B2 | 8/2013 | De Kimpe | |
| 8,670,374 B2 | 3/2014 | Bata | |
| 9,025,461 B2 | 5/2015 | Krishnamurthy | |
| 9,276,818 B2 | 3/2016 | Turon | |
| 10,111,071 B2 | 10/2018 | Polo | |
| 2005/0271021 A1 | 12/2005 | Alemany | |

(Continued)

FOREIGN PATENT DOCUMENTS

| CN | 107509160 | 12/2017 |
|---|---|---|
| TW | 270307 | 1/2007 |

(Continued)

OTHER PUBLICATIONS

Murillo et al., Bluetooth Now or Low Energy: Should BLE Mesh Become a Flooding or Connection Oriented Network? IEEE, Feb. 15, 2018.

*Primary Examiner* — Gregory B Sefcheck
*Assistant Examiner* — Brinivasa R Reddivalam
(74) *Attorney, Agent, or Firm* — Van Pelt, Yi & James LLP

(57) ABSTRACT

An instruction that is receivable by a Bluetooth device during a waking period of the Bluetooth device is transmitted, wherein the waking period of the Bluetooth device occurs cyclically with a specified cycle length and the instruction indicates to the Bluetooth device that a communication data is forthcoming to the Bluetooth device. A data transmission mode for transmission of the communication data is selected based at least in part on a first length of time needed to transmit the communication data and a second length of time equal to the waking period of the Bluetooth device. The communication data is transmitted to the Bluetooth device using the selected transmission mode.

20 Claims, 13 Drawing Sheets

(56) References Cited

U.S. PATENT DOCUMENTS

| | | | |
|---|---|---|---|
| 2006/0093998 A1* | 5/2006 | Vertegaal | H04N 7/18 |
| | | | 434/236 |
| 2006/0171540 A1 | 8/2006 | Lee | |
| 2012/0300812 A1* | 11/2012 | Ly-Gagnon | H04W 8/005 |
| | | | 375/135 |
| 2013/0145000 A1 | 6/2013 | Meyer | |
| 2015/0245204 A1 | 8/2015 | Heydon | |
| 2015/0245351 A1 | 8/2015 | Banerjea | |
| 2016/0241999 A1* | 8/2016 | Chin | G07C 9/32 |
| 2016/0286474 A1 | 9/2016 | Panwar | |
| 2017/0019752 A1* | 1/2017 | Hardt | H04W 48/16 |
| 2017/0092034 A1 | 3/2017 | Want | |
| 2017/0150362 A1 | 5/2017 | Clemenson | |
| 2017/0171754 A1 | 6/2017 | South | |
| 2017/0201854 A1 | 7/2017 | Choi | |
| 2017/0272317 A1 | 9/2017 | Singla | |
| 2018/0132102 A1 | 5/2018 | Kwon | |
| 2018/0176851 A1 | 6/2018 | Lim | |
| 2019/0037470 A1 | 1/2019 | Yeh | |

FOREIGN PATENT DOCUMENTS

| | | |
|---|---|---|
| TW | 615047 | 2/2018 |
| WO | 2017051173 | 3/2017 |

\* cited by examiner

BLUETOOTH MESH NETWORK GATEWAY AND DEVICE DATA COMMUNICATION

CROSS REFERENCE TO OTHER APPLICATIONS

This application claims priority to People's Republic of China Patent Application No. 201810654229.5 entitled A BLUETOOTH MESH NETWORK SYSTEM AND COMMUNICATION METHOD, DEVICE AND STORAGE MEDIUM THEREOF, filed Jun. 22, 2018, which is incorporated herein by reference for all purposes.

TECHNICAL FIELD

The present application relates to the field of Bluetooth wireless technology. In particular, it relates to Bluetooth wireless networks.

BACKGROUND

Bluetooth is a wireless technology standard used for transmitting and receiving data over relatively short distances. Example uses of Bluetooth wireless technology include communication between a mobile device (e.g., phone) and a handsfree headset, communication between a mobile device (e.g., phone) and a car stereo system, wireless networking when relatively little bandwidth is needed, communication between a computer and input and output devices (e.g., mouse, keyboard, printer, etc.), communication between a game console and a game controller, and other short-range communication among a plurality of devices. Bluetooth wireless technology typically uses short-wavelength radio waves (e.g., in the 2.4 gigahertz to 2.485 gigahertz range). Because radio waves are used, devices using Bluetooth wireless technology do not have to be in visual line of sight of one another in order to communicate.

BRIEF DESCRIPTION OF THE DRAWINGS

Various embodiments of the invention are disclosed in the following detailed description and the accompanying drawings.

FIG. 2b is a flow chart illustrating an embodiment of a process for communicating data from the perspective of the Bluetooth gateway of FIG. 2a.

FIG. 3b is a flow chart illustrating an embodiment of a process for communicating data from the perspective of the Bluetooth gateway of FIG. 3a.

DETAILED DESCRIPTION

Figure 1A:
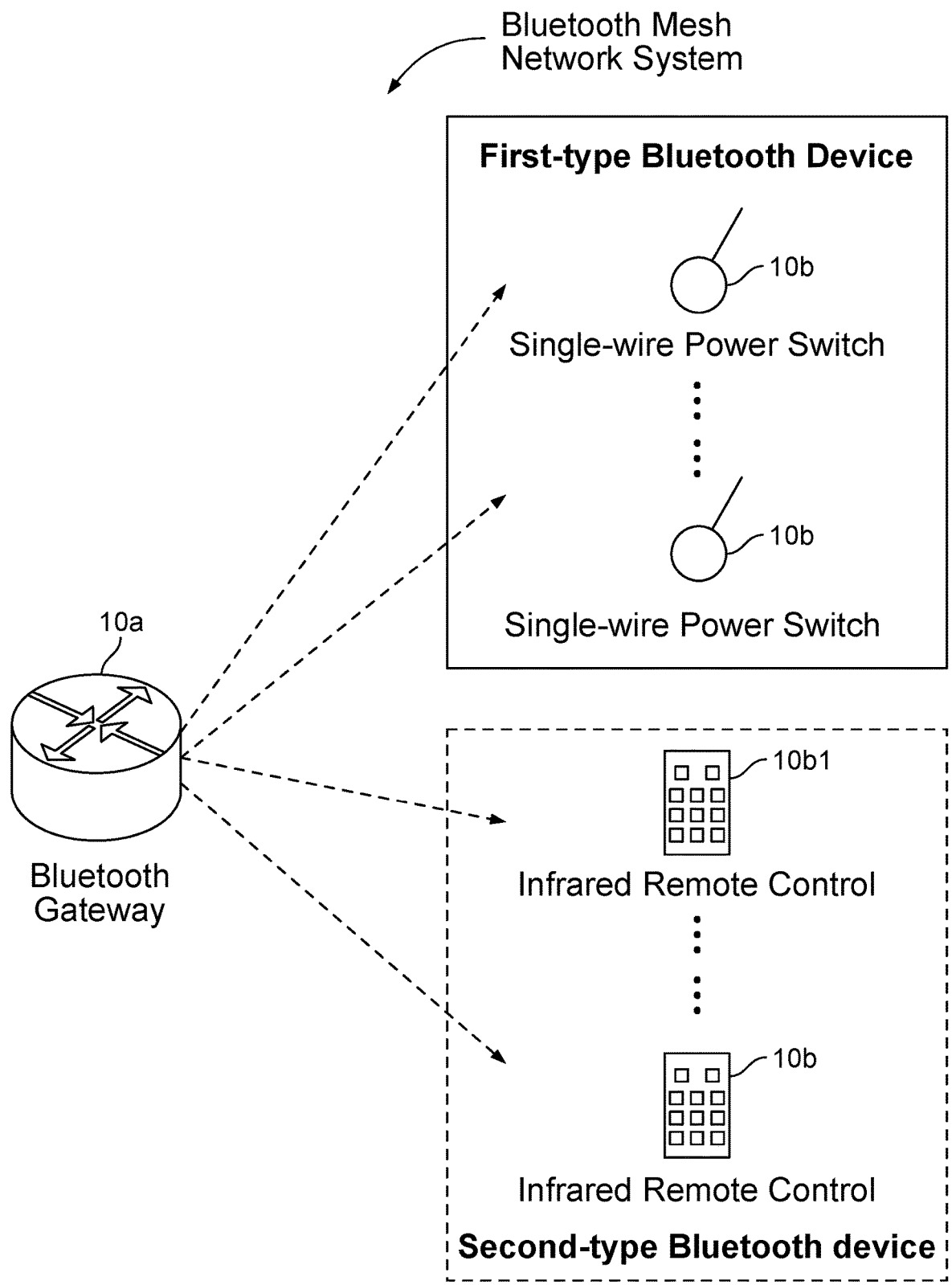
FIG. 1a is a diagram illustrating an embodiment of a Bluetooth mesh network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A Bluetooth mesh network system is a network that is formed by using Bluetooth technology to join one or more Bluetooth devices and Bluetooth gateways, whose functions are independent and whose geographic locations may differ. As used herein, a Bluetooth mesh network system may also be referred to as a Bluetooth mesh network. Bluetooth mesh networks have a topology that is based on the Bluetooth Low Energy (BLE) standard. Existing Bluetooth mesh networks include provisioners and Bluetooth devices. To ensure the security of a Bluetooth mesh network, Bluetooth devices need to be added to the Bluetooth mesh network by being provisioned by a provisioner. Bluetooth mesh networks often employ an asynchronous communication mode in which information can be received passively by both receiving and sending ends and it is not known when information will be sent by either end. To ensure that information is received and responded to in real time, a Bluetooth device must be in a receiving state with a duty cycle of 100% to avoid missing information. However, this increases the Bluetooth device's power consumption. A receiving state with a duty cycle of 100% is associated with high power consumption, which is not suitable for many battery-powered, low-power devices.

A Bluetooth mesh network gateway for transmitting communication data to a Bluetooth device is disclosed. The disclosed Bluetooth mesh network gateway comprises a processor and a memory coupled with the processor, wherein the memory is configured to provide the processor with instructions which when executed cause the processor to: transmit an instruction that is receivable by a Bluetooth device during a waking period of the Bluetooth device (wherein the waking period of the Bluetooth device occurs cyclically with a specified cycle length and the instruction indicates to the Bluetooth device that a communication data is forthcoming to the Bluetooth device), select a data transmission mode for transmission of the communication data based at least in part on a first length of time needed to transmit the communication data and a second length of time equal to the waking period of the Bluetooth device, and transmit the communication data to the Bluetooth device using the selected transmission mode.

The disclosed technique provides a low-delay, low-power communication mechanism that reduces the communication delay and power consumption of Bluetooth devices in a Bluetooth mesh network. This is superior to Bluetooth mesh network data communication mechanisms that are only low-delay or only low-power but not both low-delay and low-power.

The disclosed technique has technological advantages over Bluetooth mesh network data communication mechanisms that are low-power but high-delay. For example, the Bluetooth Mesh Profile Specification includes a "friend" and "low power" mechanism. A non-low-power device forms a "friendship" with a low-power device that is by default in a dormant state. A Bluetooth gateway sends information about the low-power device to a friend device, and the friend device caches the information. The low-power device periodically wakes up and then sends a message to the friend device asking whether it has cached information that was sent to the low-power device. If it has, the friend device can forward the information to the low-power device. This mechanism is a low-power, high-delay mechanism, which is not suitable for application scenarios that require low power and low delay.

To address the technical problems faced by Bluetooth mesh networks in low-power, low-delay application scenarios, a low-power, low-delay communication mechanism is disclosed. In this communication mechanism, a Bluetooth gateway and Bluetooth devices cooperate with each other in a Bluetooth mesh network system. In various embodiments, Bluetooth devices are by default in a dormant state and periodically enter a waking period. This reduces Bluetooth device power consumption to meet the needs of low-power devices. The Bluetooth gateway takes advantage of the fact that Bluetooth devices periodically enter a waking period. It does so by either activating the Bluetooth devices and then transmitting communication data to the Bluetooth devices while the Bluetooth devices are in an activated state (for what are referred to herein as second-type Bluetooth devices, which are described in further detail herein) or by directly transmitting communication data to the Bluetooth devices (for what are referred to herein as first-type Bluetooth devices, which are described in further detail herein). This reduces Bluetooth device communication delays and power consumption. It is thus possible to promptly transmit communication data to Bluetooth devices without having to transfer the data through friend nodes, which helps to reduce communication delays.

In some embodiments, from the perspective of a Bluetooth gateway, the communication mechanism includes intermittently transmitting a preparation instruction multiple times in response to a communication trigger event so as to take advantage of a waking period periodically occurring in a Bluetooth device (to inform the Bluetooth device of the need to prepare to receive communication data), determining a data transmission mode adapted to the Bluetooth device according to a communication capability of the Bluetooth device, and transmitting communication data in accordance with the data transmission mode adapted to the Bluetooth device. As used herein, a communication trigger event refers to an event (e.g., a user request) that triggers a Bluetooth gateway to commence communication with one or more Bluetooth devices. The communication trigger event may be a timed system event (e.g., a periodic reminder by a Bluetooth gateway to itself) to communicate with one or more Bluetooth devices, which is referred to herein as a cyclical communication event. As used herein, data transmission mode refers to how a Bluetooth gateway transmits communication data to a Bluetooth device (e.g., periodic transmission versus non-periodic transmission). As will be described in further detail herein, for first-type Bluetooth devices, an intermittent repeating transmission mode (e.g., periodic transmission) may be used, and for second-type Bluetooth devices, a short continuous transmission mode (e.g., non-periodic transmission) may be used. The intermittent repeating transmission mode is a repeating data transmission mode because the communication data is sent repeatedly. The short continuous transmission mode is a non-repeating data transmission mode because the communication data is not sent repeatedly.

In some embodiments, the communication mechanism includes intermittently transmitting an activation instruction (as opposed to a preparation instruction as mentioned above) multiple times in response to a communication trigger event to take advantage of a waking period periodically occurring in a Bluetooth device and transmitting communication data one time to the Bluetooth device while the Bluetooth device is in an activated state.

In some embodiments, from the perspective of a Bluetooth device, the communication mechanism includes periodically entering a waking period so as to receive a preparation instruction or activation instruction transmitted by a Bluetooth gateway, entering an activated state upon receiving an activation instruction and determining that it is necessary to enter the activated state, and receiving communication data transmitted by the Bluetooth gateway.

In various embodiments, a Bluetooth gateway and Bluetooth devices cooperate with each other in a Bluetooth mesh network system. Bluetooth devices normally are in a dormant state, and from the dormant state they periodically enter a waking period. The Bluetooth gateway takes advantage of the fact that Bluetooth devices periodically enter a waking period. It does so by either activating the Bluetooth devices and then transmitting communication data to the Bluetooth devices while the Bluetooth devices are in an activated state or by directly transmitting communication data to the Bluetooth devices. This reduces Bluetooth device communication delays and power consumption.

The objectives, technical schemes, and advantages of the present technique are further described below in connection with various drawings. The embodiments described are only some of the embodiments of the present technique. All other embodiments of the present technique achieved by persons with ordinary skill in the art shall fall within the scope of protection of the present application.

FIG. 1a is a diagram illustrating an embodiment of a Bluetooth mesh network system. As shown in FIG. 1a, the Bluetooth mesh network system includes Bluetooth gateway 10a and at least one Bluetooth device 10b. In some embodiments, Bluetooth gateway 10a is a computer device (e.g., the programmed computer system of FIG. 6) that supports Bluetooth communication technology, has Bluetooth detection functionality, and has processing capability. For example, Bluetooth gateway 10a may be a wireless router, a smart phone, a tablet, a personal computer, a Bluetooth probe, or another device that supports Bluetooth communication technology. The implementation of Bluetooth gateway 10a presented in FIG. 1a is merely an example and is not limiting.

Bluetooth gateway 10a typically includes at least one processing unit, at least one memory device, and a Bluetooth communication module. The number of processing units and memory devices is determined by the configuration and type for Bluetooth gateway 10a. Memory may be volatile, such as RAM, or non-volatile, such as read-only memory (ROM) or flash memory (or both types may be included). The memory typically stores an operating system (OS) and one or more applications. It may also store program data. In addition to including a processing unit, memory, and a Bluetooth communication module, Bluetooth gateway 10a may also include network card chips, I/O buses, and audio-visual components. Bluetooth gateway 10a may also include some peripheral devices such as a keyboard, a mouse, a stylus, a printer, a display, and an electronic screen. These peripheral devices are common knowledge in the art and need not be discussed in detail here.

The Bluetooth mesh network system also includes at least one Bluetooth device 10b. Bluetooth device 10b is a device that supports Bluetooth communication technology and has already successfully accessed the Bluetooth mesh network system by undergoing a provisioning procedure. It is a member node in the Bluetooth mesh network system. The at least one Bluetooth device 10b primarily refers to low-power Bluetooth devices, which may include a battery-powered, low-power Bluetooth device, e.g., an infrared remote control or low-power Bluetooth device that is powered by a single wire from an alternating current (AC) power supply, such as a single-wire power switch. The Bluetooth mesh network system may also contain a high-power Bluetooth device, e.g., a Bluetooth television set, a Bluetooth alarm, or a Bluetooth sensor (not shown in FIG. 1a). A communication mechanism may be employed for a high-power Bluetooth device, just as it would be for a low-power Bluetooth device. It is also possible to not employ a communication mechanism.

In various embodiments, provisioning is a configuration process specified in the Bluetooth Mesh Profile Specification whereby unprovisioned Bluetooth devices can become member nodes in a given Bluetooth mesh network. Provisioning includes providing unprovisioned Bluetooth devices with the provisioning data needed to successfully access a Bluetooth mesh network. Descriptions of the details of the provisioning process will be given as appropriate.

In the example shown, a Bluetooth technology-based communicative connection is established between Bluetooth gateway 10a and at least one Bluetooth device 10b. Bluetooth gateway 10a and the at least one Bluetooth device 10b may communicate on the basis of this communicative connection. Communication between Bluetooth gateway 10a and the Bluetooth device(s) 10b includes direct communication processes between Bluetooth gateway 10a and the Bluetooth device(s) and also includes Bluetooth gateway 10a performing transfer communication processes for two Bluetooth devices.

In various embodiments, to reduce power consumption associated with communication for Bluetooth devices in the Bluetooth mesh network system, a Bluetooth device 10b uses a "dormant+waking" mechanism, e.g., the Bluetooth device 10b is in a default dormant state but wakes up periodically and then returns to the dormant state. This approach can reduce the power consumption of the Bluetooth device 10b and meet low-power requirements. Because the Bluetooth mesh network system, in various embodiments, employs asynchronous communication, the Bluetooth device 10b periodically enters a waking period so that it can receive communication data and meet low-delay communication requirements.

The cyclical period according to which the Bluetooth device 10b enters a waking period (e.g., the time period between two wakeups) and the length of that waking period can be set as is suitable for an application scenario. The example shown does not limit the values that may be assigned. For example, the cyclical period according to which the Bluetooth device 10b enters a waking period from a dormant state may be 1 second (sec) and the waking period may be 30 milliseconds (ms). Stated alternatively, the Bluetooth device 10b may enter one 30 ms waking period every 1 sec. The "1 sec" and "30 ms" which are mentioned here are merely examples of the cyclical period according to which the Bluetooth device 10b enters a waking period and the length of that waking period. Possible numerical values are not limited to these values.

In the example shown, Bluetooth gateway 10a coordinates with the dormant+waking mechanism of the Bluetooth devices. Bluetooth gateway 10a takes advantage of the fact that each Bluetooth device 10b periodically enters a waking period from a dormant state to communicate with the Bluetooth device on the basis of the waking period of the Bluetooth device. A new communication mechanism may thus be implemented, which not only meets low-power requirements, but also meets low-delay requirements.

The communication capabilities of different Bluetooth devices 10b may differ. In the example shown, the ratio of Bluetooth device 10b's receiving time for the maximum volume of data that needs to be received in a single communication process and its waking period is a communication capability metric. Bluetooth devices may be classified as different types depending on communication capability metrics. Bluetooth devices may be classified as first-type devices, second-type devices, etc.

A first-type Bluetooth device can be classified as a device whose receiving time for the maximum data volume in a single communication process is less than the waking period of the Bluetooth device. For example, when the waking period is 30 ms, the communication data that a single-wire power switch needs to receive within 30 ms is an "on" instruction or an "off" instruction. Thus, a single-wire power switch can be classified as a first-type Bluetooth device if on/off instructions can be received within a specified amount of time less than the waking period. Bluetooth devices similar to a single-wire power switch in this respect can also be classified as first-type Bluetooth devices.

A second-type Bluetooth device can be classified as a device whose receiving time for the maximum data volume in a single communication process is greater than or equal to the waking period. For example, when the waking period is 30 ms, the communication data that needs to be received by an infrared remote control may include an instruction to switch from a first channel to a second channel, and if the receiving time for this channel-switching instruction is greater than or equal to 30 ms, the infrared remote control would be classified as a second-type Bluetooth device. Bluetooth devices similar to the infrared remote control in this respect can also be classified as second-type Bluetooth devices. Stated alternatively, a data volume threshold value can be determined for a specific application scenario based on the waking period of a Bluetooth device 10$b$ and a data transmission rate in that application scenario. Any Bluetooth device that needs to receive a maximum data volume in a single communication process that is less than the data volume threshold value can be classified as a first-type Bluetooth device. Conversely, any Bluetooth device that needs to receive a maximum data volume in a single communication process that is greater than or equal to the data volume threshold value can be classified as a second-type Bluetooth device.

In some embodiments, the Bluetooth mesh network system includes one or more first-type Bluetooth devices and one or more second-type Bluetooth device, as shown in FIG. 1$a$. In some embodiments, there is just one type of Bluetooth device in the Bluetooth mesh network system. For example, there may be just first-type Bluetooth devices, or there may be just second-type Bluetooth devices. A Bluetooth mesh network system that has only first-type Bluetooth devices is shown in FIG. 2$a$. A Bluetooth mesh network system that has only second-type Bluetooth devices is shown in FIG. 3$a$. With respect to the Bluetooth mesh network systems shown in FIGS. 1$a$, 2$a$, and 3$a$, the communication processes performed by Bluetooth gateway 10$a$ and the Bluetooth devices 10$b$ will vary, as will be explained individually below.

In the Bluetooth mesh network system shown in FIG. 1$a$, there are Bluetooth devices 10$b$ of more than one type. Because Bluetooth gateway 10$a$ may not in some situations be able to determine which type of Bluetooth device it needs to communicate with, Bluetooth gateway 10$a$ uses a communication mechanism that can adapt to the communication capabilities of all types of Bluetooth devices 10$b$. This helps to reduce communication delays. The example of communication conducted between Bluetooth gateway 10$a$ and a destination Bluetooth device 10$b$1 is used to simplify the description of this communication mechanism. The destination Bluetooth device 10$b$1 may be any Bluetooth device in the Bluetooth mesh network system shown in FIG. 1$a$. Stated alternatively, destination Bluetooth device 10$b$1 is one of Bluetooth devices 10$b$ and is singled out for explanatory purposes. The example communication process that Bluetooth gateway 10$a$ conducts with the destination Bluetooth device 10$b$1 is as follows:

Bluetooth gateway 10$a$ intermittently transmits a preparation instruction multiple times in response to a communication trigger event. The purpose of Bluetooth gateway 10$a$ intermittently transmitting a preparation instruction multiple times is to take advantage of waking periods periodically occurring from the dormant state of destination Bluetooth device 10$b$1 to notify destination Bluetooth device 10$b$1 of the need to prepare to receive communication data. Each Bluetooth device 10$b$ (including destination Bluetooth device 10$b$1) in the Bluetooth mesh network system is normally in a dormant state. From the dormant state, the Bluetooth device periodically enters a waking period so as to receive a preparation instruction transmitted by Bluetooth gateway 10$a$.

In various embodiments, the data volume of a preparation instruction is relatively small and the receiving time for a preparation instruction is less than the waking period. Stated alternatively, destination Bluetooth device 10$b$1 can successfully receive the preparation instruction during its waking period. In addition, the number of times that Bluetooth gateway 10$a$ transmits the preparation instruction will vary according to different application scenarios. For example, Bluetooth gateway 10$a$ may continuously transmit the preparation instruction within a specific time interval 30 times, 40 times, 50 times, 60 times, 120 times, etc. The numbers of times given here are illustrative and not restrictive. In some embodiments, Bluetooth gateway 10$a$ periodically transmits the preparation instruction in accordance with the same specified length time interval (as opposed to using multiple intervals of different lengths, which is also possible).

In various embodiments, to ensure that the preparation instruction can be received by the destination Bluetooth device 10$b$1, the total transmission time for the preparation instruction needs to be greater than the cyclical period according to which the waking period occurs and the transmission interval between two consecutive instances of the preparation instruction needs to be less than the waking period. For example, the total transmission time for the preparation instruction may be 1.2 times the cyclical period according to which the waking period occurs. The waking period, the cyclical period according to which the waking period occurs, the total transmission time of the preparation instruction, and the transmission interval between two consecutive instances of the preparation instruction may be set adaptively according to the application scenario. For example, suppose the waking period of each Bluetooth device in the Bluetooth mesh network system is 30 ms and the cyclical period according to which the waking period occurs is 1 sec. Suppose the transmission interval between two consecutive instances of the preparation instruction is 10 ms and the total transmission time for the preparation instruction is 1.2 sec. With a period of 1.2 sec, it is possible to transmit the preparation instruction a total of 120 times. Stated alternatively, given a Bluetooth device waking period of 30 ms that occurs every 1 sec, transmitting a 10 ms preparation instruction 120 times in a row (for 1.2 sec) ensures that the preparation instruction will be received in its entirety by the Bluetooth device. Note that theoretically the 10 ms preparation instruction could be sent as few as approximately 100 times (1 sec divided by 10 ms) because in this example the waking period occurs every 1 sec. Sending the preparation instruction continuously for 1.2 sec provides an extra margin for error. The numerical values referred to here and the numerical magnitude relationships are merely illustrative and not restrictive.

In some embodiments, Bluetooth gateway 10$a$ includes a broadcast address in the preparation instruction and intermittently transmits the preparation instruction in broadcast mode multiple times (whether or not Bluetooth gateway 10$a$ is able to use a communication trigger event as a basis to predetermine the destination Bluetooth device 10$b$1). Each Bluetooth device (including the destination Bluetooth device 10$b$1) in the Bluetooth mesh network system periodically enters a waking period from a dormant state and, while in the waking period, receives the preparation instruction transmitted by Bluetooth gateway 10$a$. In various embodiments, if the Bluetooth device receives the preparation instruction while in a waking period, then it receives communication data transmitted by Bluetooth gateway 10a. In such a situation, when each Bluetooth device 10b receives communication data transmitted by Bluetooth gateway 10a, each Bluetooth device would determine whether it is the destination Bluetooth device based on a unicast address in the communication data. The destination Bluetooth device may then execute corresponding actions based on the communication data. Bluetooth devices that are not the destination Bluetooth device may discard the received communication data. Stated alternatively, when receiving communication data in broadcast mode, a Bluetooth device can determine if it is the intended recipient (destination Bluetooth device) by specific data (e.g., unicast address) in the communication data. If it is not the intended recipient, the Bluetooth device can discard the received data.

In some embodiments, Bluetooth gateway 10a uses a communication trigger event as a basis to predetermine the destination Bluetooth device 10b1, includes the unicast address of the destination Bluetooth device 10b1 in the preparation instruction, and intermittently transmits the preparation instruction to the destination Bluetooth device 10b1 multiple times. Each Bluetooth device 10b (including the destination Bluetooth device 10b1) in the Bluetooth mesh network system periodically enters a waking period from a dormant state and, while in the waking period, receives the preparation instruction transmitted by Bluetooth gateway 10a. If a Bluetooth device receives the preparation instruction while in a waking period, it may determine whether it is the destination Bluetooth device based on the unicast address in the received preparation instruction. If the Bluetooth device determines that it is the destination Bluetooth device, it would prepare to receive data, e.g., enter an activated state so as to promptly receive communication data transmitted by Bluetooth gateway 10a. If the Bluetooth device determines that it is not the destination Bluetooth device, it would discard the preparation instruction and not prepare to receive data.

In various embodiments, Bluetooth gateway 10a supports multiple modes of data transmission. Different modes of data transmission are adapted to different communication capabilities or different types of Bluetooth devices. Bluetooth gateway 10a may determine the data transmission mode adapted to the destination Bluetooth device 10b1 based on the communication capability of the destination Bluetooth device 10b1 and thereupon transmit communication data in accordance with the data transmission mode adapted to the destination Bluetooth device 10b1 so that the destination Bluetooth device 10b1 receives the communication data. After the destination Bluetooth device 10b1 prepares to receive data, it may receive the communication data transmitted by Bluetooth gateway 10a. The fact that the mode whereby Bluetooth gateway 10a transmits the communication data is adapted to the communication capability of destination Bluetooth device 10b1 makes it easy for destination Bluetooth device 10b1 to promptly receive communication data. This helps to reduce communication delays.

In some embodiments, Bluetooth gateway 10a determines the data transmission mode adapted to the destination Bluetooth device 10b1 during the period when Bluetooth gateway 10a transmits the preparation instruction. Bluetooth gateway 10a may also determine the data transmission mode adapted to the destination Bluetooth device 10b1 after Bluetooth gateway 10a stops transmitting the preparation instruction. If Bluetooth gateway 10a determines the data transmission mode adapted to the destination Bluetooth device 10b1 during the period when it transmits the preparation instruction, it may avoid spending extra time to determine the data transmission mode adapted to the destination Bluetooth device 10b1. This helps to reduce communication delays.

In addition, the type of the destination Bluetooth device 10b1 will vary according to the communication capability of the destination Bluetooth device 10b1, and there will be variations in how it prepares to receive data, the data transmission mode adapted to the destination Bluetooth device 10b1 determined by Bluetooth gateway 10a, and how the communication data is transmitted.

When the destination Bluetooth device 10b1 is a first-type Bluetooth device, the receiving time for the communication data that is to be transmitted by Bluetooth gateway 10a is less than the waking period. The destination Bluetooth device 10b1 may remain in a dormant state and periodically enter a waking period from the dormant state so that it receives the communication data transmitted by Bluetooth gateway 10a during a waking period. When the destination Bluetooth device 10b1 is a first-type Bluetooth device, Bluetooth gateway 10a may determine that the data transmission mode adapted to the destination Bluetooth device 10b1 is an intermittent repeating transmission mode. Correspondingly, in accordance with the intermittent repeating transmission mode, Bluetooth gateway 10a may intermittently transmit communication data to the destination Bluetooth device 10b1 multiple times so that the destination Bluetooth device 10b1 receives communication data in a waking period. The destination Bluetooth device 10b1 may first receive a preparation instruction while in one waking period and then receive communication data transmitted by Bluetooth gateway 10a during a subsequent waking period.

The number of times that Bluetooth gateway 10a transmits the communication data will vary according to different application scenarios. For example, Bluetooth gateway 10a may continuously transmit the communication data within a specific time interval 3 times, 5 times, 10 times, 20 times, 30 times, 40 times, 50 times, 60 times, 120 times, etc. The times given here are illustrative and not restrictive. In some embodiments, Bluetooth gateway 10a periodically transmits the communication data with the same time interval. In some embodiments, different time intervals are used.

In some embodiments, to ensure that the communication data can be received by the destination Bluetooth device 10b1, the total transmission time for the communication data needs to be greater than the cyclical period according to which the waking period occurs and the transmission interval between two consecutive instances of communication data needs to be less than the waking period. For example, the total transmission time for the communication data may be 1.2 times the cyclical period according to which the waking period occurs. The waking period, the cyclical period according to which the waking period occurs, the total transmission time of the communication data, and the transmission interval between two consecutive instances of communication data may be set adaptively according to the application scenario. For example, the waking period of each Bluetooth device in the Bluetooth mesh network system may be 30 ms, and the cyclical period according to which the waking period occurs may be 1 sec. The transmission interval between two consecutive instances of communication data may be 10 ms, and the total transmission time for the communication data may be 1.2 sec. In a period of 1.2 sec, it would be possible to transmit the communication data a total of 120 times. This helps to ensure that the destination Bluetooth device 10b1 successfully receives the communication data. The numerical values referred to here and the numerical magnitude relationships are merely illustrative. The total transmission time of the communication data and the transmission interval between two consecutive instances of transmission data may be the same as the total transmission time of the preparation instruction and the transmission interval between two consecutive instances of the preparation instruction, or they may be different.

When the destination Bluetooth device 10b1 is a second-type Bluetooth device, the receiving time for the communication data that is to be transmitted by Bluetooth gateway 10a is greater than or equal to the waking period. In order to receive communication data, the destination Bluetooth device 10b1 may enter an activated state so as to successfully receive communication data transmitted by Bluetooth gateway 10a. The activated state exists in relation to the dormant state and refers to being in a receiving state with a duty cycle of 100% for a period of time. The duration of the activated state is based on the ability to fully receive communication data. It may be set adaptively according to application scenarios. For example, the duration of the activated state may be 10 sec, 15 sec, 8 sec, 30 sec, etc.

When the destination Bluetooth device 10b1 is a second-type Bluetooth device, Bluetooth gateway 10a may determine that the data transmission mode adapted to the destination Bluetooth device 10b1 is a short continuous transmission mode. With the short continuous transmission mode, Bluetooth gateway 10a may transmit communication data to the destination Bluetooth device one time so that the destination Bluetooth device receives communication data while in an activated state. In various embodiments, if the destination Bluetooth device 10b1 receives a preparation instruction while in one waking period, it then enters an activated state and receives communication data transmitted by Bluetooth gateway 10a while in an activated state. After the activated state ends, the destination Bluetooth device 10b1 may re-enter a dormant state from which it periodically enters a waking period in order to wait for the next communication.

In various embodiments, there is no limit placed on the forms that a communication trigger event may take. Any event that may trigger Bluetooth gateway 10a to communicate with the destination Bluetooth device 10b1 is applicable here. Illustrative examples of communication trigger events are provided below:

In a first scenario, Bluetooth gateway 10a is in a dormant state in order to conserve power. When Bluetooth gateway 10a needs to communicate with a Bluetooth device in the Bluetooth mesh network system, Bluetooth gateway 10a may need to be woken up by a wake-up instruction. In this first scenario, the wake-up instruction for Bluetooth gateway 10a may be a communication trigger event. In response to a wake-up instruction for Bluetooth gateway 10a, Bluetooth gateway 10a may spontaneously and intermittently transmit a preparation instruction multiple times after Bluetooth gateway 10a is woken up. The Bluetooth device that a user desires to communicate with Bluetooth gateway 10a can be referred to as the destination Bluetooth device 10b1. Bluetooth gateway 10a may not know which Bluetooth device is the destination Bluetooth device 10b1. Therefore, Bluetooth gateway 10a may transmit a preparation instruction in broadcast mode. Each Bluetooth device 10b, including the destination Bluetooth device 10b1, in the Bluetooth mesh network system would receive a preparation instruction during the wake-up period, and in this way the objective of transmitting a preparation instruction to the destination Bluetooth device 10b1 is achieved.

There are many approaches that the user may employ to issue the wake-up instruction. For example, when Bluetooth gateway 10a has a speech recognition feature and supports spoken instructions, the user may issue a wake-up instruction to Bluetooth gateway 10a in speech mode and thereby wake up Bluetooth gateway 10a. To give another example, when Bluetooth gateway 10a has a touchscreen and supports touch operations, the user may issue a wake-up instruction by performing a touch operation on the touchscreen of Bluetooth gateway 10a and thereby wake up Bluetooth gateway 10a.

In a second scenario, the communication trigger event may be unrelated to the state of Bluetooth gateway 10a. When it is necessary for Bluetooth gateway 10a to communicate with a Bluetooth device in the Bluetooth mesh network system, the user may issue a communication instruction to Bluetooth gateway 10a. In this second scenario, the communication instruction issued by the user may be a communication trigger event. Bluetooth gateway 10a may intermittently transmit a preparation instruction multiple times in response to a communication instruction issued by the user. The Bluetooth device the user desires to communicate with Bluetooth gateway 10a can be referred to as the destination Bluetooth device 10b1. If the communication instruction issued by the user includes identification information for the destination Bluetooth device 10b1, Bluetooth gateway 10a may know in advance which Bluetooth device is the destination Bluetooth device 10b1 and may employ a unicast mode to transmit the preparation instruction and thus achieve the objective of transmitting a preparation instruction to the destination Bluetooth device 10b1. If the communication instruction issued by the user does not include identification information for the destination Bluetooth device 10b1, Bluetooth gateway 10a would not know which Bluetooth device is the destination Bluetooth device 10b1. Therefore, in various embodiments, it would employ a broadcast mode to transmit the preparation instruction. Thus, each Bluetooth device 10b, including the destination Bluetooth device 10b1, in the Bluetooth mesh network system would receive a preparation instruction during a wake-up period, and in this way the objective of transmitting a preparation instruction to the destination Bluetooth device 10b1 is achieved. The identification information for the destination Bluetooth device 10b1 may be the name, device model number, and other such information of the destination Bluetooth device.

There are many approaches that the user may employ to issue the communication instruction. For example, when Bluetooth gateway 10a has a speech recognition feature and supports spoken instructions, the user may issue a communication instruction in speech mode. To give another example, when Bluetooth gateway 10a has a display screen and supports human-machine interactions, Bluetooth gateway 10a may provide the user with a human-machine interface. The user may issue communication instructions through a communication instruction control or an option on the human-machine interface.

In a third scenario, Bluetooth gateway 10a may need to communicate periodically with Bluetooth devices in the Bluetooth mesh network system. Bluetooth gateway 10a may set a communication cycle. Whenever it is time to communicate according to the cycle, a communication process with the Bluetooth devices begins. In this third scenario, the cyclical communication event may serve as the communication trigger event. Bluetooth gateway 10a may intermittently transmit a preparation instruction multiple times in response to a cyclical communication event. The Bluetooth device that needs to periodically communicate with Bluetooth gateway 10*a* can be referred to as the destination Bluetooth device 10*b*1. Bluetooth gateway 10*a* may know in advance which Bluetooth device is the destination Bluetooth device 10*b*1.

In some embodiments, Bluetooth gateway 10*a* obtains communication data during the period when it transmits the preparation instruction. This provides a data foundation for transmission of the communication data. Obtaining communication data during the period of transmitting the preparation instruction does not require extra time to acquire communication data. This helps to further decrease communication delays.

In some scenarios, e.g., in the first and second scenarios described above, the user may control the destination Bluetooth device 10*b*1. For example, the user may cause a single-wire power switch to turn on or off, or a user may cause an infrared remote control to change channels. After issuing a wake-up instruction or a communication instruction, the user may issue a control instruction to Bluetooth gateway 10*a* for the purpose of controlling the destination Bluetooth device 10*b*1. The control instruction may be a speech control instruction (the possibilities are not limited to this). Bluetooth gateway 10*a* may receive a control instruction for controlling the destination Bluetooth device during the period when it transmits the preparation instruction. The control instruction may be converted into communication data. The "convert" mentioned here can refer to the conversion of data formats and data types.

Figure 1B:
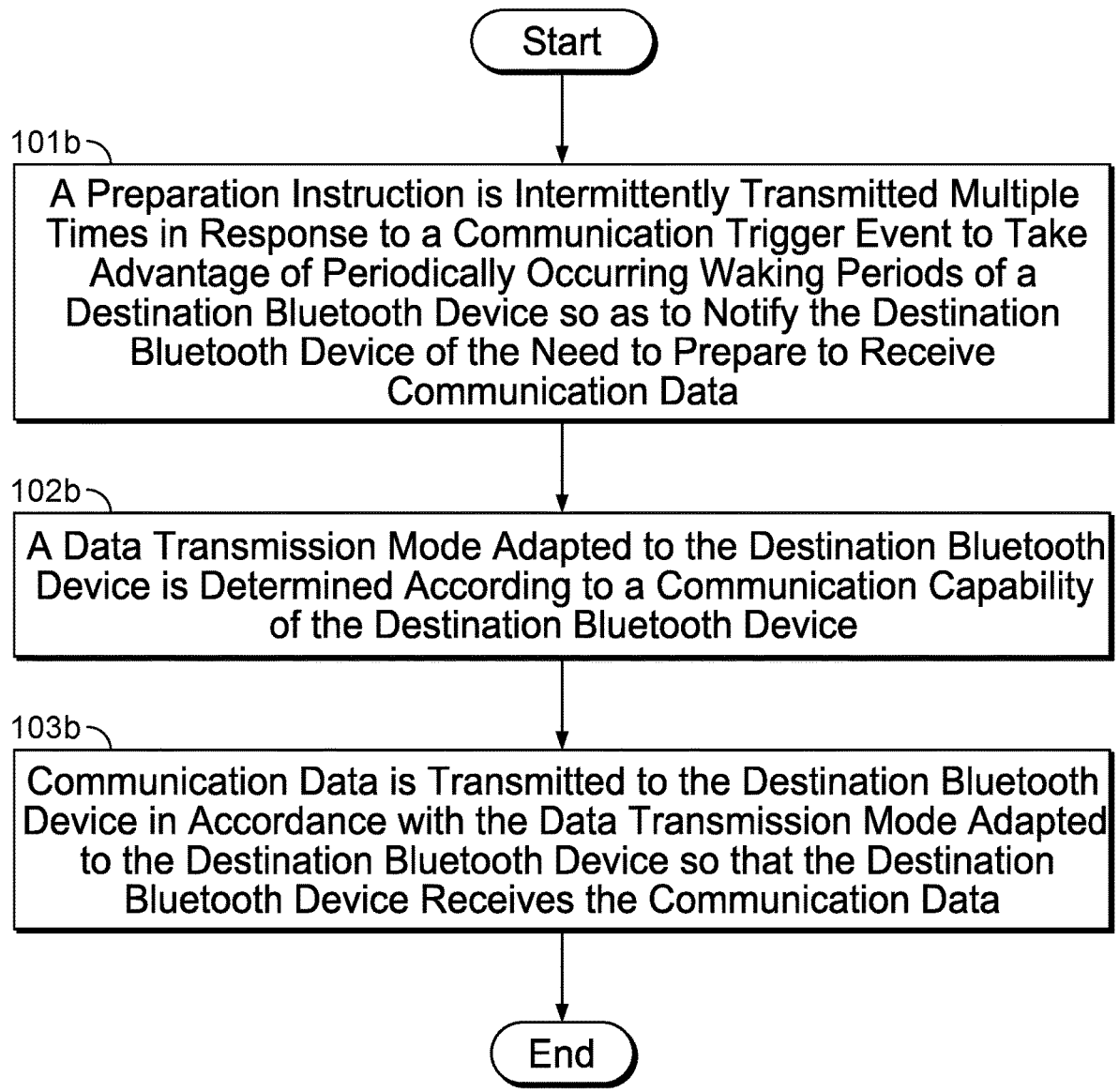
FIG. 1b is a flow chart illustrating an embodiment of a process for communicating data from the perspective of a Bluetooth gateway.

FIG. 1*b* is a flow chart illustrating an embodiment of a process for communicating data from the perspective of a Bluetooth gateway. In some embodiments, the process of FIG. 1*b* is performed by Bluetooth gateway 10*a* of FIG. 1*a*.

At 101*b*, a preparation instruction is intermittently transmitted multiple times in response to a communication trigger event to take advantage of periodically occurring waking periods of a destination Bluetooth device so as to notify the destination Bluetooth device of the need to prepare to receive communication data. In response to a wake-up instruction for the Bluetooth gateway, the Bluetooth gateway may spontaneously and intermittently transmit a preparation instruction multiple times after it is woken up. The Bluetooth gateway may also intermittently transmit a preparation instruction multiple times in response to a communication instruction issued by a user. The Bluetooth gateway may also intermittently transmit a preparation instruction multiple times in response to a cyclical communication event.

In some embodiments, communication data is obtained during the period of transmitting the preparation instruction. Obtaining communication data during the period of transmitting the preparation instruction does not require extra time. This helps to decrease communication delays.

In some scenarios, e.g., in the first and second scenarios described above, the user may control the destination Bluetooth device. For example, the user may cause a single-wire power switch to turn on or off, or a user may cause an infrared remote control to change channels. After issuing a wake-up instruction or a communication instruction, the user may issue a control instruction to the Bluetooth gateway for the purpose of controlling the destination Bluetooth device. The Bluetooth gateway may receive a control instruction for controlling the destination Bluetooth device during the period when the Bluetooth gateway transmits the preparation instruction. The Bluetooth gateway may convert the control instruction into communication data. The "convert" mentioned here can refer to the conversion of data formats and data types.

At 102*b*, a data transmission mode adapted to the destination Bluetooth device is determined according to a communication capability of the destination Bluetooth device. If the destination Bluetooth device is a first-type Bluetooth device, it is determined that the data transmission mode adapted to the destination Bluetooth device is an intermittently repeating transmission mode (a first-type Bluetooth device being a device whose receiving time for the maximum data volume in a single communication process is less than the waking period). It would be possible to intermittently transmit the communication data to the destination Bluetooth device multiple times in accordance with the intermittent repeating transmission mode so that the destination Bluetooth device receives the communication data during a waking period that periodically occurs.

If the destination Bluetooth device is a second-type Bluetooth device, it is determined that the data transmission mode adapted to the destination Bluetooth device is a short continuous transmission mode (a second-type Bluetooth device being a device whose receiving time for the maximum data volume in a single communication process is greater than or equal to the waking period). It would be possible to transmit the communication data one time in accordance with the short continuous transmission mode so the destination Bluetooth device receives the communication data while in an activated state, wherein the destination Bluetooth device enters an activated state after receiving a preparation instruction.

In some embodiments, to ensure that the preparation instruction can be received by the destination Bluetooth device, the total transmission time for the preparation instruction needs to be greater than the cyclical period according to which the waking period occurs, and the transmission interval between two consecutive instances of the preparation instruction needs to be less than the waking period. For example, the total transmission time for the preparation instruction may be 1.2 times the cyclical period according to which the waking period occurs. The waking period, the cyclical period according to which the waking period occurs, the total transmission time of the preparation instruction, and the transmission interval between two consecutive instances of the preparation instruction may be set adaptively according to the application scenario. For example, the waking period of each Bluetooth device in the Bluetooth mesh network system may be 30 ms, and the cyclical period according to which the waking period occurs may be 1 sec. The transmission interval between two consecutive instances of the preparation instruction may be 10 ms, and the total transmission time for the preparation instruction may be 1.2 sec. In a period of 1.2 sec, it is possible to transmit the preparation instruction a total of 120 times. This helps to ensure that the Bluetooth device successfully receives the preparation instruction. The numerical values referred to here and the numerical magnitude relationships are illustrative and not restrictive. In addition, the total transmission time of the communication data and the transmission interval between two consecutive instances of transmission data may be the same as the total transmission time of the preparation instruction and the transmission interval between two consecutive instances of the preparation instruction, or they may be different.

At 103*b*, communication data is transmitted to the destination Bluetooth device in accordance with the data transmission mode adapted to the destination Bluetooth device so that the destination Bluetooth device receives the communication data.

In various embodiments, a Bluetooth gateway cooperates with Bluetooth devices. The Bluetooth gateway takes advantage of the fact that the Bluetooth devices periodically enter a waking period from a dormant state. In various embodiments, the Bluetooth gateway takes advantage of a waking period to send a preparation instruction to a Bluetooth device to notify the Bluetooth device of the need to prepare to receive data. Then the Bluetooth gateway may use a data transmission mode adapted to the Bluetooth device to send communication data. By normally being in a dormant state, the Bluetooth devices can lower power consumption, and the fact that there is no need anywhere in the communication process for transfers via friend nodes helps to reduce communication delays.

Figure 1C:
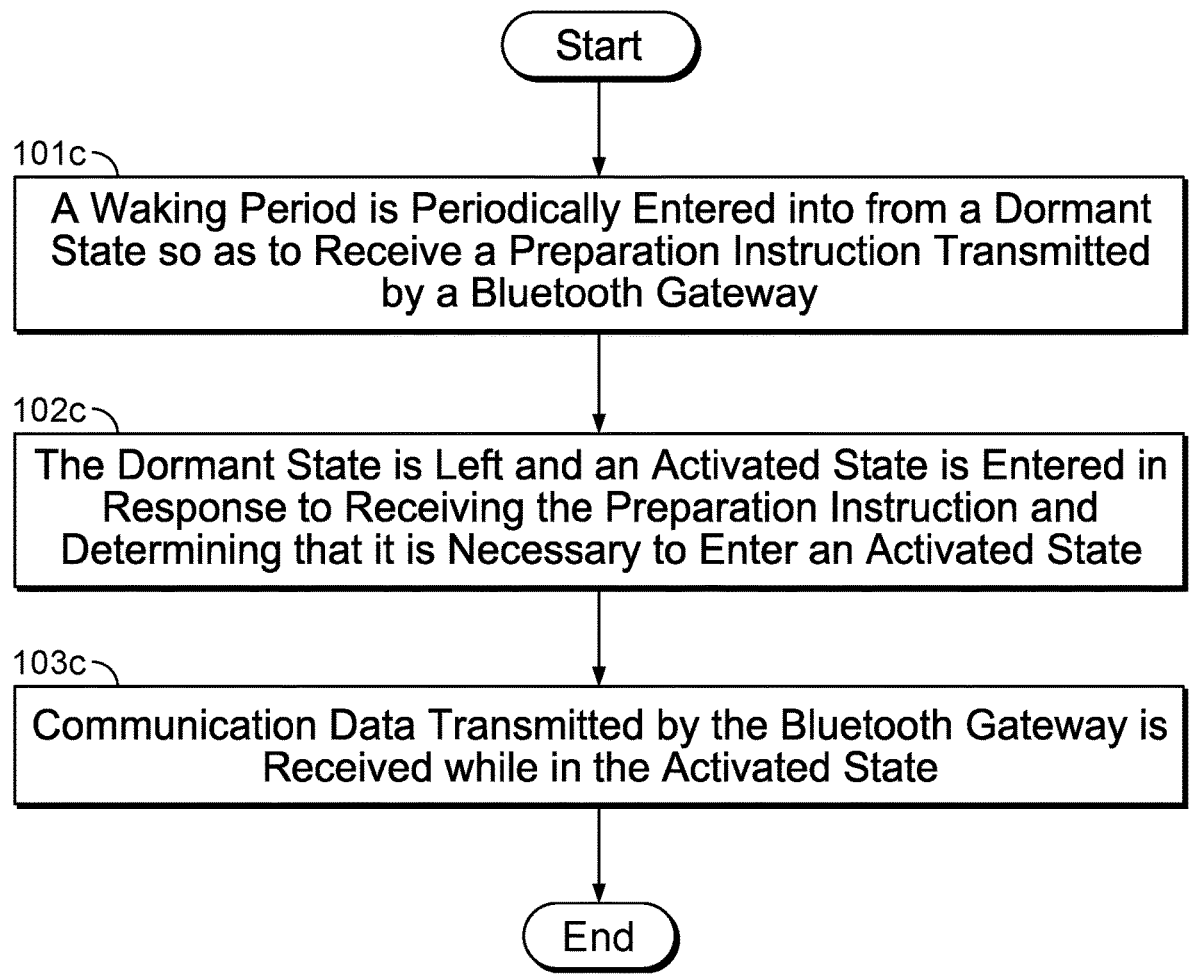
FIG. 1c is a flow chart illustrating an embodiment of a process for communicating data from the perspective of a second-type Bluetooth device.

FIG. 1c is a flow chart illustrating an embodiment of a process for communicating data from the perspective of a second-type Bluetooth device. In some embodiments, the process of FIG. 1c is performed by one of the Bluetooth devices 10b of FIG. 1a.

At 101c, a waking period is periodically entered into from a dormant state so as to receive a preparation instruction transmitted by a Bluetooth gateway. A second-type Bluetooth device may reduce its power consumption and satisfy the requirements of low power consumption by normally being in a dormant state. A Bluetooth device may periodically enter a waking period from a dormant state, and when in the waking period, it may receive a preparation instruction transmitted by a Bluetooth gateway.

At 102c, the dormant state is left and an activated state is entered in response to receiving the preparation instruction and determining that it is necessary to enter an activated state. If a preparation instruction is received while in a waking period, it may be determined that entering an activated state is needed based on address information included in the preparation instruction.

In some embodiments, if the preparation instruction received by a second-type Bluetooth device includes a unicast address, the Bluetooth device may compare the unicast address in the preparation instruction to its own unicast address. If the two are the same, it may be determined that the Bluetooth device is the destination Bluetooth device and that it needs to enter an activated state. Conversely, if the two are different, it may be determined that the Bluetooth device is not the destination Bluetooth device and that it does not need to enter an activated state.

In some embodiments, if the preparation instruction received by a second-type Bluetooth device includes a broadcast address, it is necessary for the Bluetooth device to enter an activated state. In this situation, when the Bluetooth device in an activated state receives communication data sent by the Bluetooth gateway, it may compare the unicast address in the communication data with its own unicast address. If the two are the same, the Bluetooth device may determine that it is the destination Bluetooth device. The Bluetooth device may then execute the appropriate action based on the received communication data. Conversely, if the two are different, the Bluetooth device may determine that it is not the destination Bluetooth device and thereupon may discard the received communication data.

At 103c, communication data transmitted by the Bluetooth gateway is received while in the activated state. Communication data transmitted by the Bluetooth gateway may be received while in the activated state in response to a determination that entering an activated state is needed. There is no need anywhere in the process for transfer via a friend node. This helps to reduce communication delays.

Figure 1D:
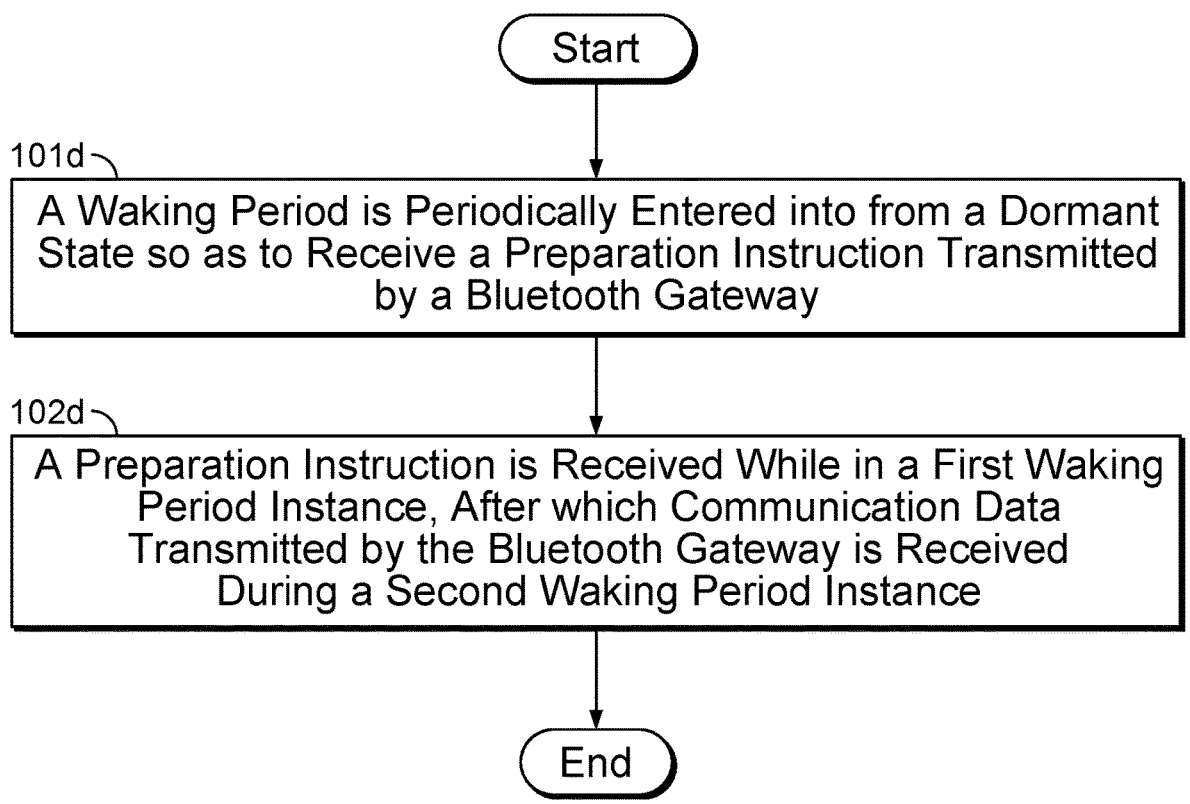
FIG. 1d is a flow chart illustrating an embodiment of a process for communicating data from the perspective of a first-type Bluetooth device.

FIG. 1d is a flow chart illustrating an embodiment of a process for communicating data from the perspective of a first-type Bluetooth device. In some embodiments, the process of FIG. 1c is performed by one of the Bluetooth devices 10b of FIG. 1a.

At 101d, a waking period is periodically entered into from a dormant state so as to receive a preparation instruction transmitted by a Bluetooth gateway. A first-type Bluetooth device may reduce its power consumption and satisfy the requirements of low power consumption by normally being in a dormant state. The Bluetooth device may periodically enter a waking period from a dormant state, and when in the waking period, the Bluetooth device may receive a preparation instruction transmitted by a Bluetooth gateway.

At 102d, a preparation instruction is received while in a first waking period instance, after which communication data transmitted by the Bluetooth gateway is received during a second waking period instance. If the preparation instruction is received while in a waking period, communication data transmitted by the Bluetooth gateway is then received during a subsequent waking period. There is no need for transfer via a friend node anywhere in the communication process. This helps to reduce communication delays. A first-type Bluetooth device may, without having to change its state, remain in a state of periodically entering a waking period state from a dormant state.

In some embodiments, if the preparation instruction received by a first-type Bluetooth device includes a unicast address, the Bluetooth device may compare the unicast address in the preparation instruction to its own unicast address. If the two are the same, it may be determined that the Bluetooth device is the destination Bluetooth device. Conversely, if the two are different, it may be determined that the Bluetooth device is not the destination Bluetooth device.

In some embodiments, if the preparation instruction received by a first-type Bluetooth device includes a broadcast address, it is not possible to determine whether the Bluetooth device is the destination Bluetooth device based on the preparation instruction. In this situation, when the Bluetooth device receives communication data sent by the Bluetooth gateway, the Bluetooth device may compare the unicast address in the communication data with its own unicast address. If the two are the same, it may be determined that the Bluetooth device is the destination Bluetooth device. Conversely, if the two are different, it may be determined that the Bluetooth device is not the destination Bluetooth device. If a first-type Bluetooth device determines that it is the destination Bluetooth device, it may execute the appropriate action based on the received communication data. Conversely, if the Bluetooth device determines that it is not the destination Bluetooth device, the Bluetooth device may discard the received communication data.

The executing entity for each step of the example processes described herein may be the same device, or different devices may serve as the executing entity. For example, the executing entity of steps 101c through 103c may be device A. Or, in another example, the executing entity of steps 101c and 102c may be device A, and the executing entity of step 103c may be device B.

In addition, some of the processes described in the above embodiments and in the drawings contain multiple operations which appear according to a specific sequence. However, these operations may be executed according to a sequence other than the one that appears in the text or may be executed in parallel. Operation sequence numbers such as 101c and 102c merely serve to differentiate the different operations from each other. The sequence numbers themselves do not represent any sequence of execution. In addition, these processes may include more or fewer operations, and these operations may be executed sequentially or in parallel. The descriptors "first," "second," and so on are for differentiating different messages, devices, modules, and so on and do not represent a sequence, nor do "first" and "second" limit them to different types.

Figure 1E:
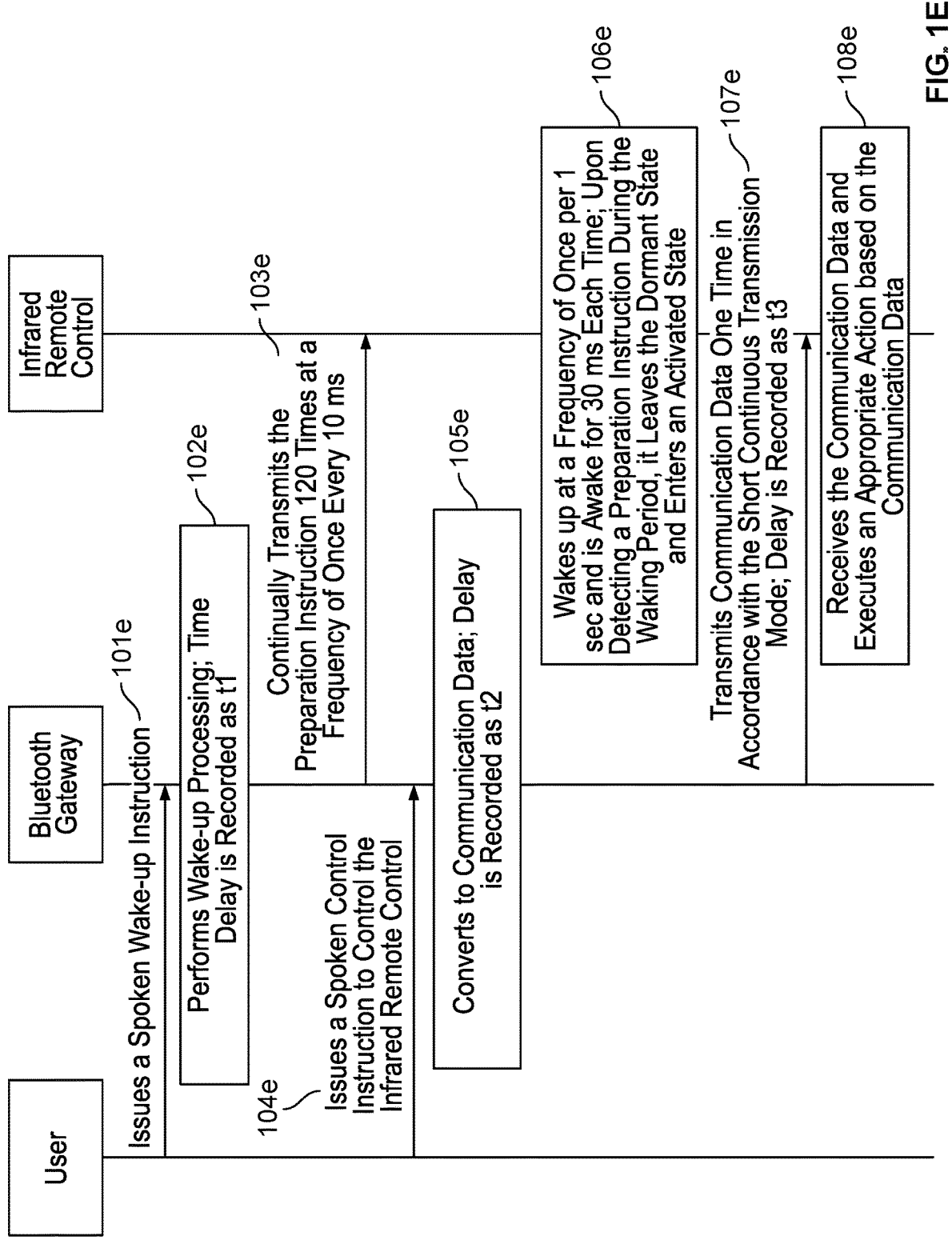
FIG. 1e is a diagram illustrating an example of data communication in a Bluetooth mesh network system comprising a Bluetooth gateway, an infrared remote control, and a single-wire power switch.

FIG. 1e is a diagram illustrating an example of data communication in a Bluetooth mesh network system comprising a Bluetooth gateway, an infrared remote control, and a single-wire power switch. In this Bluetooth mesh network system, data communication when a user controls the infrared remote control through the Bluetooth gateway is shown in FIG. 1e (an infrared remote control, a second-type Bluetooth device, is the destination Bluetooth device). In some embodiments, the Bluetooth mesh network system of FIG. 1e is the Bluetooth mesh network system of FIG. 1a.

In the example shown, at 101e, a user issues a spoken wake-up instruction such as "Hi, prepare to work" or "Hi, hello." At 102e, the Bluetooth gateway performs wake-up processing in response to the spoken wake-up instruction. The processing delay for the spoken wake-up instruction is recorded as t1. At 103e, after being activated, the Bluetooth gateway starts the preparation instruction and continually transmits it 120 times at a frequency of once every 10 ms for a total of 1.2 sec. At 104e, during the period when the Bluetooth gateway transmits the preparation instruction, suppose that the user issues a spoken control instruction, e.g., "Change channel from Channel 1 to Channel 5," to control the infrared remote control. At 105e, the Bluetooth gateway receives the spoken control instruction and converts the spoken control instruction into communication data. The processing delay for the spoken control instruction is recorded as t2. The length of t2 may be greater than 1.2 sec. At 106e, the infrared remote control wakes up at a frequency of once per 1 sec and is awake for 30 ms each time. During the waking period, the infrared remote control checks for a preparation instruction. When a preparation instruction is detected, the infrared remote control leaves the dormant state and enters an activated state (e.g., a receiving state for a duration of 10 sec with a duty cycle of 100%).

All of the Bluetooth devices in the Bluetooth mesh network system may wake up at a frequency of once per 1 sec and be awake for 30 ms each time, listening for a preparation instruction during the waking periods. In some embodiments, the timing of steps 103e through 105e is such that steps 103e through 105e occur at the same time. At 107e, the Bluetooth gateway selects a short continuous transmission mode adapted to the infrared remote control and transmits communication data one time to the infrared remote control in accordance with the short continuous transmission mode. The delay for this transmission process is recorded as t3. At 108e, the infrared remote control receives the communication data and executes an appropriate action based on the communication data.

In the communication process described above, the total delay is t=t1+t2+t3. It can be calculated from the numerical values set above, such as 1 sec, 30 ms, and 10 ms. In some situations, the total delay may be 2 sec. The delay for this communication process is less than for other communication mechanisms. In addition, for the user, t1 and t2 are spoken dialogue delays. The delay for executing actions is t3, and t3 may be less than 300 ms, which is not a lengthy delay in terms of user experience. Furthermore, when there is no user control instruction, the infrared remote control is operating at low power most of the time (e.g., when waking for 30 ms every 1 sec, the infrared remote control would be in a receiving state with a duty cycle of 3%). This is an advantage with regard to low power consumption.

If the user, at step 104e, issues a control instruction to a single-wire power switch (a first-type Bluetooth device), the single-wire power switch would not need to enter an activated state. Correspondingly, at step 107e, the data transmission mode selected by the Bluetooth gateway could be an intermittent repeating transmission mode. For example, in accordance with a mode similar to that of step 103e, it is possible to continually transmit communication data 120 times at a frequency of once every 10 ms for a total of 1.2 sec. The single-wire power switch may remain in a waking state for 30 ms every 1 sec. It would have three opportunities within 30 ms to receive the communication data, and it only needs to receive the communication data once.

The sequence of some of the steps shown in FIG. 1e may be flexibly adjusted according to differences in delays. For example, step 103e may be executed after step 104e. That is, the user may first issue a spoken control instruction, e.g., "Change channel from Channel 1 to Channel 5" to control the remote control. The Bluetooth gateway may receive the spoken control instruction issued by the user and start processing the spoken control instruction. While processing the spoken control instruction, the Bluetooth gateway may start a preparation instruction and continually transmits it 120 times at a frequency of once every 10 ms for a total of 1.2 sec. In this situation, the Bluetooth gateway may use the unicast address of the infrared remote control. The Bluetooth gateway would only need to wake the infrared remote control and not other Bluetooth devices. This conserves the power that would have been wasted on waking other Bluetooth devices, but would add to the time spent by the user issuing a spoken control instruction to control the infrared remote control. To give another example, step 103e may be executed after 105e. After the spoken control instruction is converted to communication data, the preparation instruction may be continually transmitted at a frequency of once every 10 ms as a unicast transmission to the infrared remote control 120 times. This can conserve power that would have been wasted waking up other Bluetooth devices, but it would add to the t2 delay.

Figure 1F:
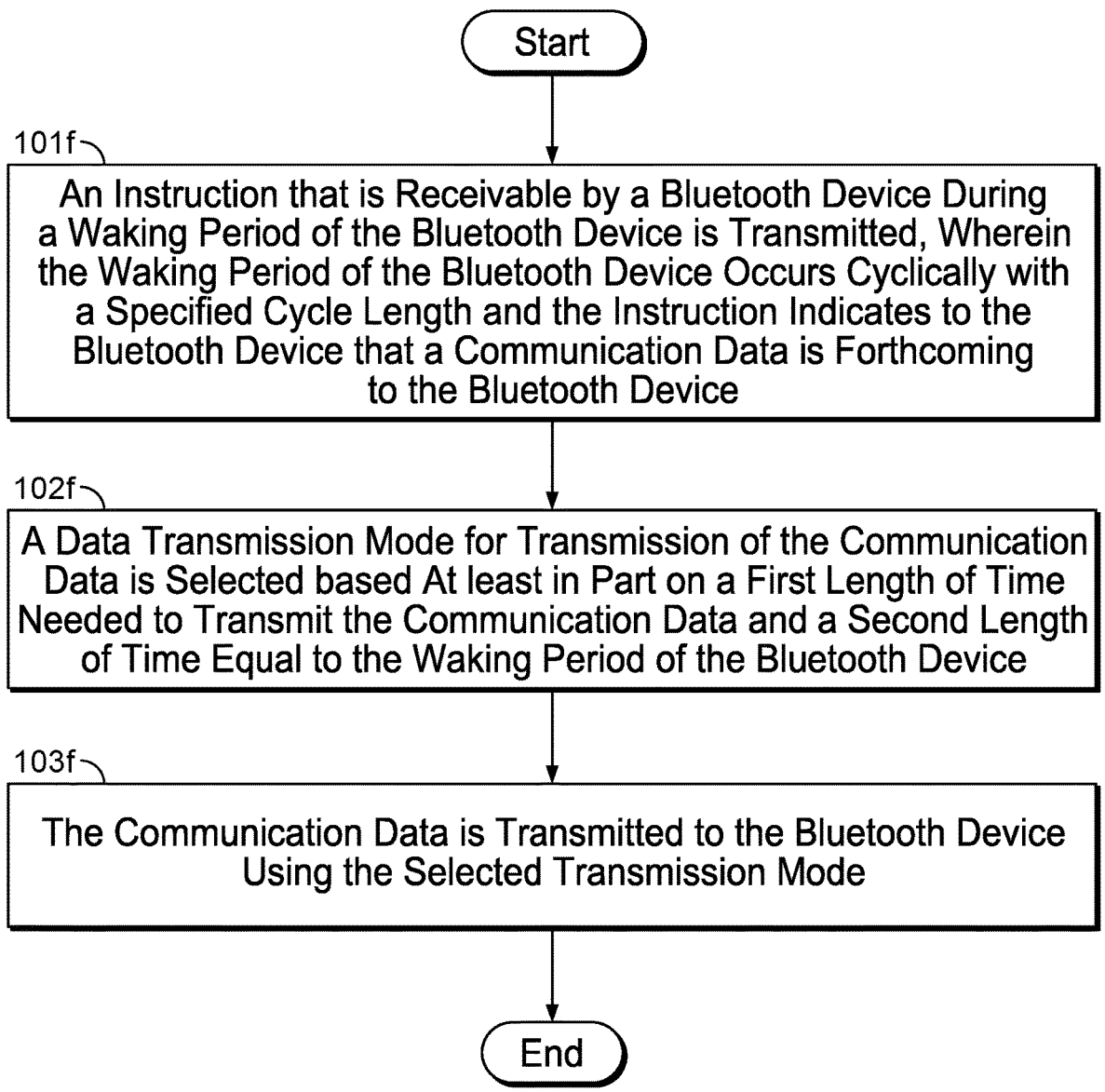
FIG. 1f is a flow chart illustrating an embodiment of a process for communicating data to a Bluetooth device.

FIG. 1f is a flow chart illustrating an embodiment of a process for communicating data to a Bluetooth device. In some embodiments, the process of FIG. 1f is performed by Bluetooth gateway 10a of FIG. 1a.

At 101f, an instruction that is receivable by a Bluetooth device during a waking period of the Bluetooth device is transmitted, wherein the waking period of the Bluetooth device occurs cyclically with a specified cycle length and the instruction indicates to the Bluetooth device that a communication data is forthcoming to the Bluetooth device. The instruction may be a preparation instruction (as described herein, e.g., with respect to FIGS. 1a-1e) or an activation instruction (as described herein, e.g., with respect to FIG. 3b). As described herein, both a preparation instruction and an activation instruction would indicate to the Bluetooth device that communication data is forthcoming (via either a repeating data transmission mode or a non-repeating data transmission mode). As described above, in various embodiments, a Bluetooth device uses a "dormant+waking" mechanism, e.g., the Bluetooth device is in a default dormant state but wakes up periodically and then returns to the dormant state. In various embodiments, the waking period of the Bluetooth device occurs cyclically (e.g., periodically) with a specified cycle length (e.g., occurs every 1 sec as described herein with respect to various examples). In some embodiments, the waking period is 30 ms.

At 102*f*, a data transmission mode for transmission of the communication data is selected based at least in part on a first length of time needed to transmit the communication data and a second length of time equal to the waking period of the Bluetooth device. If the first length of time is less than the second length of time, this means that the communication data can be transmitted in its entirety within a waking period. As described above, this means that the Bluetooth device can be classified as a first-type Bluetooth device and communication data can be sent using an intermittent repeating transmission mode (as described above). The intermittent repeating transmission mode is a repeating data transmission mode because the communication data is sent repeatedly. For example, the communication data may be sent repeatedly for 1.2 sec (with or without time gaps in between repeats of the communication data) or longer until the communication data is received within a waking period of the Bluetooth device. This data transmission mode conserves Bluetooth device power because the Bluetooth device does not need to enter an activated state (e.g., with a duty cycle of 100% for a period of time) in order to receive the communication data.

If the first length of time is greater than or equal to the second length of time, this means that the communication data cannot be transmitted in its entirety within a waking period. As described above, this means that the Bluetooth device can be classified as a second-type Bluetooth device and communication data can be sent using a short continuous transmission mode (as described above). The short continuous transmission mode is a non-repeating data transmission mode because the communication data is not sent repeatedly. In some embodiments, the communication data is sent once while the Bluetooth device is in an activated state (e.g., with a duty cycle of 100% for a period of time). The Bluetooth device would need to be in the activated state for at least as long as the length of time needed to transmit the communication data.

At 103*f*, the communication data is transmitted to the Bluetooth device using the selected transmission mode. For example, for first-type Bluetooth devices, a repeating data transmission mode (e.g., intermittent repeating transmission mode) may be used, and for second-type Bluetooth devices, a non-repeating data transmission mode (e.g., short continuous transmission mode) may be used.

Figure 2A:
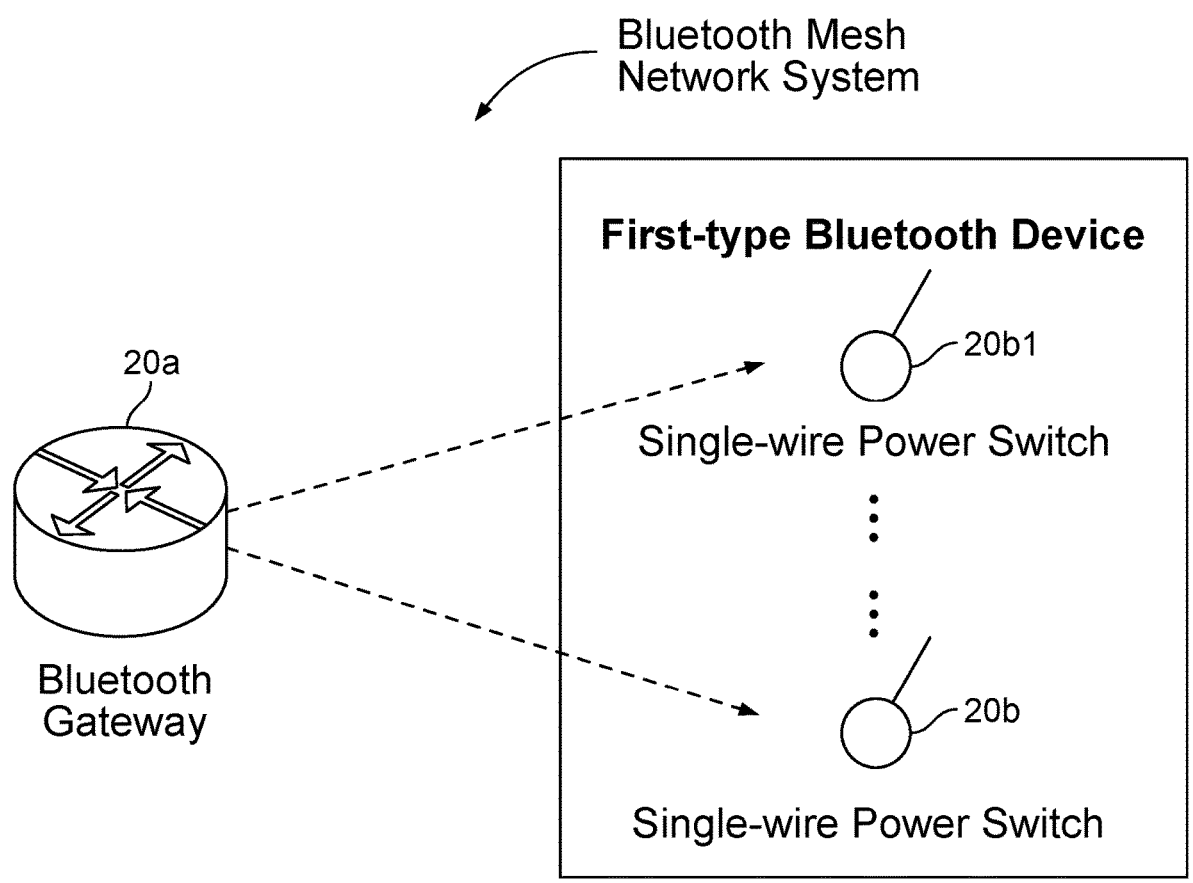
FIG. 2a is a diagram illustrating an embodiment of a Bluetooth mesh network system that only includes first-type Bluetooth devices.

FIG. 2*a* is a diagram illustrating an embodiment of a Bluetooth mesh network system that only includes first-type Bluetooth devices. As shown in FIG. 2*a*, the Bluetooth mesh network system includes a Bluetooth gateway 20*a* and at least one Bluetooth device 20*b*. Bluetooth devices 20*b*, as referred to herein, include Bluetooth device 20*b*1.

The Bluetooth mesh network system shown in FIG. 2*a* is similar to the Bluetooth mesh network system shown in FIG. 1*a*, a difference being that all of the Bluetooth devices 20*b* in the Bluetooth mesh network system shown in FIG. 2*a* are first-type Bluetooth devices. Therefore, with regard to some of the descriptions of Bluetooth gateway 20*a* and the Bluetooth devices 20*b*, the descriptions of Bluetooth gateway 10*a* and the Bluetooth devices 10*b* in the embodiment shown in FIG. 1*a* are also applicable. They will not be discussed further here.

In the Bluetooth mesh network system shown in FIG. 2*a*, Bluetooth gateway 20*a* employs a data transmission mode (e.g., an intermittent repeating mode) adapted to the communication capability of first-type Bluetooth devices to transmit communication data to the Bluetooth devices 20*b*. This helps to further reduce communication delays. With this communication mechanism, Bluetooth gateway 20*a* has the same communication process with every Bluetooth device 20*b*. The example of communication conducted between Bluetooth gateway 20*a* and the destination Bluetooth device 20*b*1 is used to simplify the description of this communication mechanism in the example shown. The destination Bluetooth device 20*b*1 may be any Bluetooth device in the Bluetooth mesh network system shown in FIG. 2*a*.

Figure 2B:
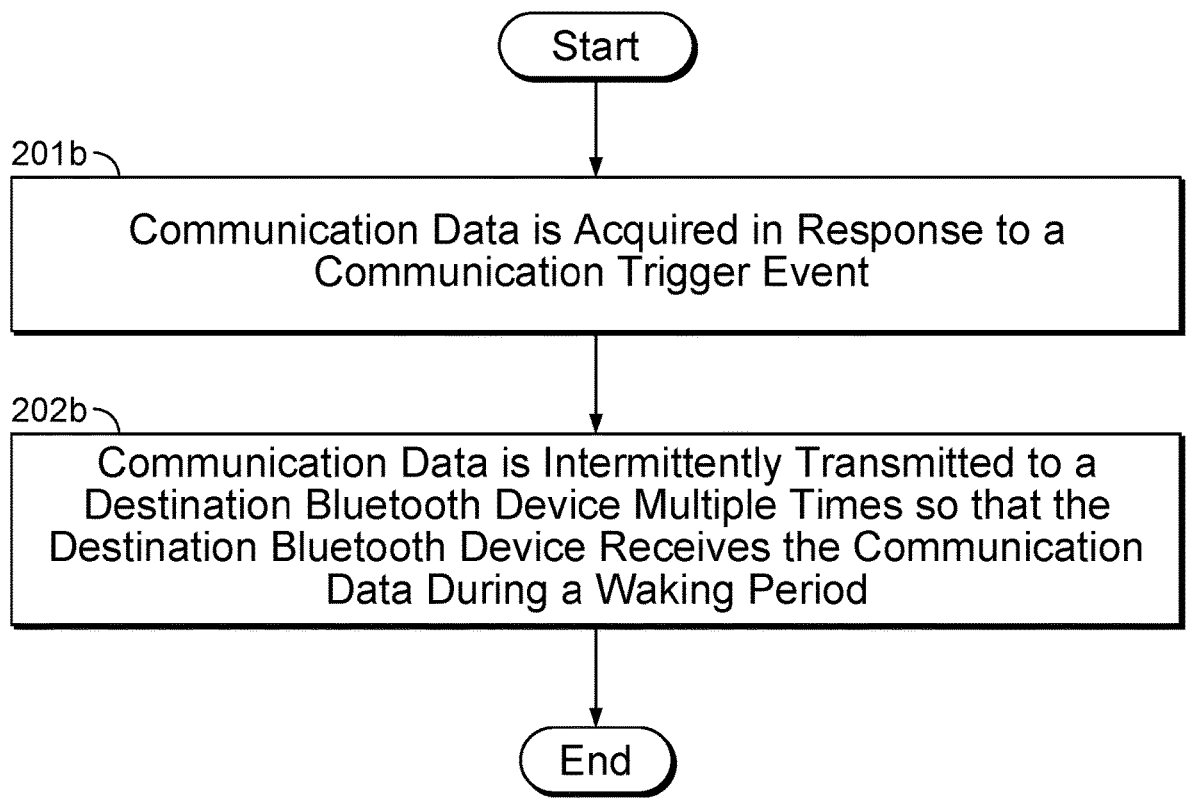

FIG. 2*b* is a flow chart illustrating an embodiment of a process for communicating data from the perspective of the Bluetooth gateway of FIG. 2*a*. In some embodiments, the process of FIG. 2*b* is performed by Bluetooth gateway 20*a* of FIG. 2*a*.

At 201*b*, communication data is acquired in response to a communication trigger event. In some embodiments, the Bluetooth gateway by default is in a dormant state. The communication trigger event may take many forms. Any event that triggers the Bluetooth gateway to communicate with the destination Bluetooth device can be the communication trigger event. Example communication trigger events are described with respect to the embodiment shown in FIG. 1*a*. They will not be discussed further here.

At 202*b*, communication data is intermittently transmitted to a destination Bluetooth device multiple times so that the destination Bluetooth device receives the communication data during a waking period. The destination Bluetooth device is a first-type Bluetooth device. This means that the time required by the destination Bluetooth device to receive communication data transmitted by the Bluetooth gateway is less than the waking period of the destination Bluetooth device. Therefore, the Bluetooth gateway can take advantage of the waking period that periodically occurs to transmit the communication data to the destination Bluetooth device. The Bluetooth gateway may intermittently transmit the communication data multiple times to the destination Bluetooth device.

First-type Bluetooth devices (including the destination Bluetooth device) in the Bluetooth mesh network system may be in a dormant state. From the dormant state, they may periodically enter a waking period so as to receive communication data transmitted by the Bluetooth gateway while in the waking period. If any Bluetooth device receives communication data while in a waking period, it may compare the unicast address carried in the communication data with its own unicast address. If the two are the same, then the Bluetooth device is the destination Bluetooth device. Conversely, if the two are different, then the Bluetooth device is not the destination Bluetooth device. If the Bluetooth device determines that it is the destination Bluetooth device, it may execute an appropriate action, e.g., turn on an appliance, based on the received communication data. If the Bluetooth device determines that it is not the destination Bluetooth device, it may discard the received communication data.

When it is necessary for the Bluetooth gateway to communicate with a Bluetooth device, a wake-up instruction may be used to wake up the Bluetooth gateway. After the Bluetooth gateway is awake, a control instruction is issued to control the destination Bluetooth device. Therefore, the Bluetooth gateway may be woken up in response to a wake-up instruction issued to the Bluetooth gateway, and after the Bluetooth gateway is awake, it receives a control instruction to control the destination Bluetooth device. Furthermore, the Bluetooth gateway converts the control instruction into communication data. Then it can intermittently transmit the communication data multiple times to the destination Bluetooth device so that the Bluetooth device receives the communication data during a waking period.

The number of times that the Bluetooth gateway transmits the communication data will vary according to different application scenarios. For example, the Bluetooth gateway may continuously transmit the communication data within a specific time interval 3 times, 5 times, 10 times, 20 times, 30 times, 40 times, 50 times, 60 times, 120 times, etc. The numbers of times given here are merely illustrative and not restrictive. The Bluetooth gateway may periodically transmit the communication data in accordance with the same time interval.

To ensure that the communication data can be received by the destination Bluetooth device, the total transmission time for the communication data needs to be greater than the cyclical period according to which the waking period occurs, and the transmission interval between two consecutive instances of communication data needs to be less than the waking period. The total transmission time for the communication data may be 1.2 times the cyclical period according to which the waking period occurs. The waking period, the cyclical period according to which the waking period occurs, the total transmission time of the communication data, and the transmission interval between two consecutive instances of communication data may be set adaptively according to the application scenario. For example, the waking period of each Bluetooth device in the Bluetooth mesh network system may be 30 ms, and the cyclical period according to which the waking period occurs may be 1 sec. The transmission interval between two consecutive instances of the communication data may be 10 ms, and the total transmission time for the communication data may be 1.2 sec. In a period of 1.2 sec, it is possible to transmit the communication data a total of 120 times. This helps to ensure that the Bluetooth device successfully receives the communication data. The numerical values referred to here and the numerical magnitude relationships are merely illustrative and not restrictive.

Figure 3A:
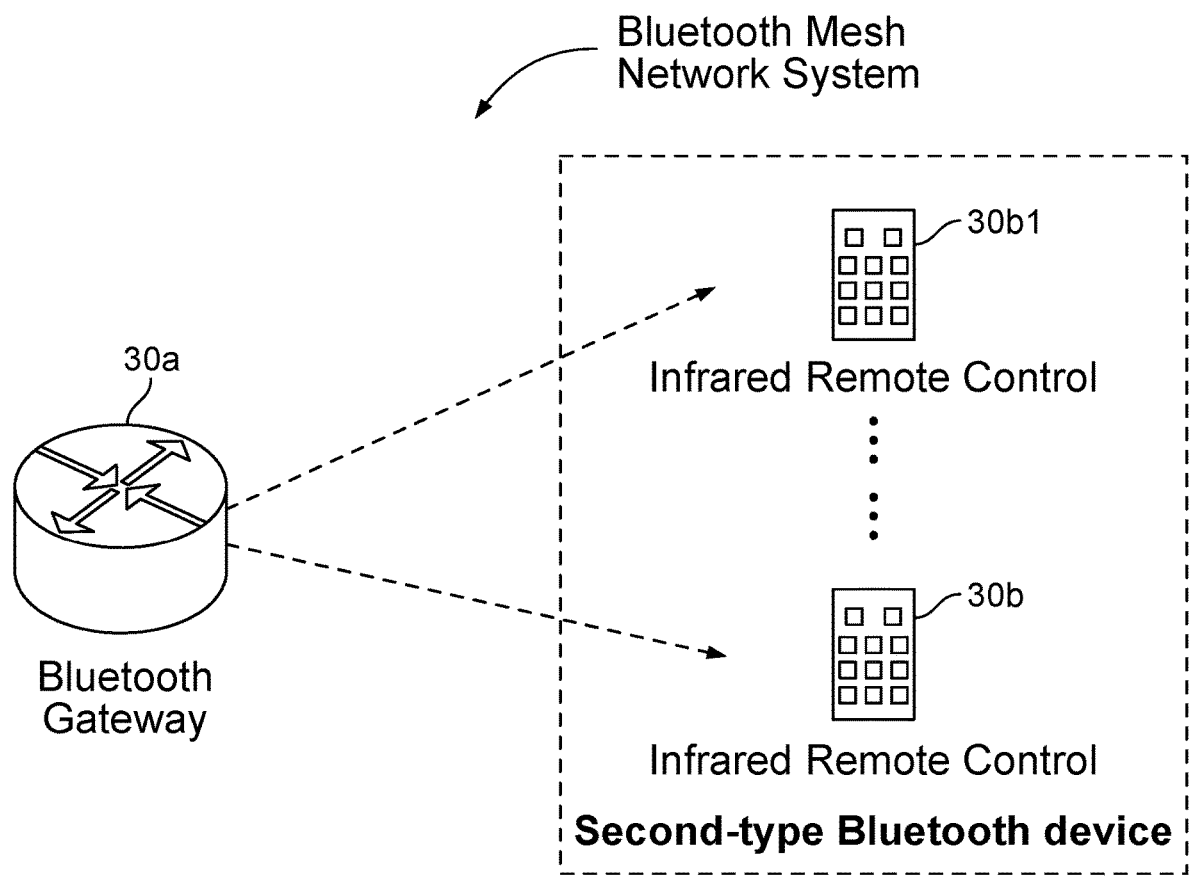
FIG. 3a is a diagram illustrating an embodiment of a Bluetooth mesh network system that only includes second-type Bluetooth devices.

FIG. 3a is a diagram illustrating an embodiment of a Bluetooth mesh network system that only includes second-type Bluetooth devices. As shown in FIG. 3a, the Bluetooth mesh network system includes a Bluetooth gateway 30a and at least one Bluetooth device 30b. Bluetooth devices 30b, as referred to herein, include Bluetooth device 30b1.

The Bluetooth mesh network system shown in FIG. 3a is similar to the Bluetooth mesh network system shown in FIG. 1a, a difference being that all of the Bluetooth devices 30b in the Bluetooth mesh network system shown in FIG. 3a are second-type Bluetooth devices. Therefore, with regard to some of the descriptions of Bluetooth gateway 30a and the Bluetooth devices 30b, the descriptions of Bluetooth gateway 10a and the Bluetooth devices 10b in the embodiment shown in FIG. 1a are also applicable. They will not be discussed further here.

In the Bluetooth mesh network system shown in FIG. 3a, Bluetooth gateway 30a employs a data transmission mode (e.g., a continuous short mode) adapted to the communication capability of second-type Bluetooth devices to transmit communication data to the Bluetooth devices 30b. This helps to further reduce communication delays. With this communication mechanism, Bluetooth gateway 30a has the same communication process with every Bluetooth device 30b. The example of communication conducted between the Bluetooth gateway 30a and the destination Bluetooth device 30b1 is used to simplify the description of this communication mechanism in the example shown. The destination Bluetooth device 30b1 may be any Bluetooth device in the Bluetooth mesh network system shown in FIG. 3a.

Figure 3B:
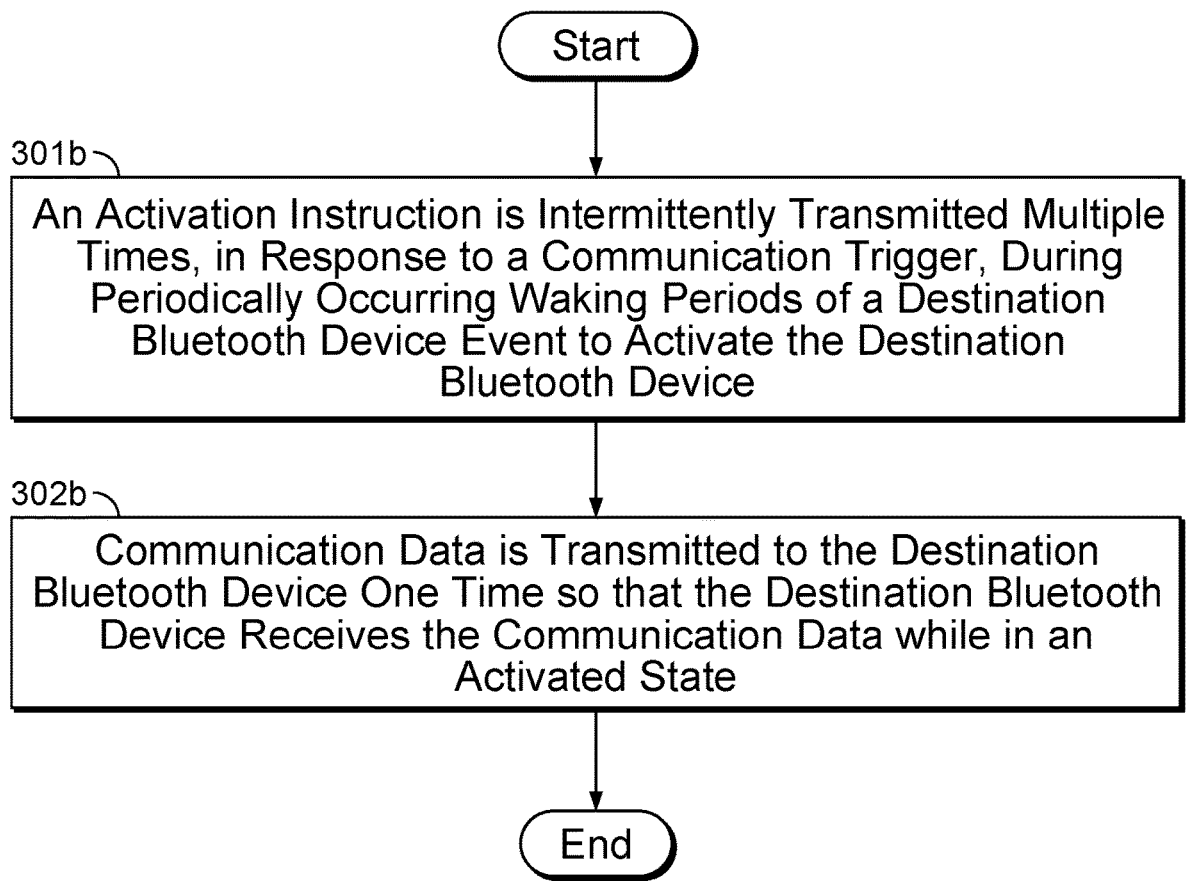

FIG. 3b is a flow chart illustrating an embodiment of a process for communicating data from the perspective of the Bluetooth gateway of FIG. 3a. In some embodiments, the process of FIG. 3b is performed by Bluetooth gateway 30a of FIG. 3a.

At 301b, an activation instruction is intermittently transmitted multiple times, in response to a communication trigger, during periodically occurring waking periods of a destination Bluetooth device event to activate the destination Bluetooth device. The objective in step 301b of intermittently transmitting an activation instruction multiple times is to take advantage of periodically occurring waking periods of the destination Bluetooth device so as to notify the destination Bluetooth device of the need to prepare to receive communication data. In various embodiments, Bluetooth devices (including the destination Bluetooth device) in the Bluetooth mesh network system are normally in a dormant state and periodically enter a waking period so as to receive an activation instruction transmitted by the Bluetooth gateway.

The communication trigger event may take many forms. Any event that triggers the Bluetooth gateway to communicate with the destination Bluetooth device can be the communication trigger event. Example communication trigger events are described with respect to the embodiment shown in FIG. 1a. They will not be discussed further here.

In various embodiments, the data volume of an activation instruction is relatively small and the receiving time for an activation instruction is less than the waking period. This means that the destination Bluetooth device can successfully receive the activation instruction during its waking period as soon as the activation instruction arrives at the destination Bluetooth device. In addition, the number of times that the Bluetooth gateway transmits the activation instruction will vary according to different application scenarios. For example, the Bluetooth gateway may continuously transmit the activation instruction within a specific time interval 30 times, 40 times, 50 times, 60 times, 120 times, etc. The numbers of times given here are merely illustrative and not restrictive. The Bluetooth gateway may periodically transmit the activation instruction in accordance with the same time interval.

In some embodiments, to ensure that the activation instruction can be received by the destination Bluetooth device, the total transmission time for the activation instruction needs to be greater than the cyclical period according to which the waking period occurs, and the transmission interval between two consecutive instances of the activation instruction needs to be less than the waking period. The total transmission time for the activation instruction may be 1.2 times the cyclical period according to which the waking period occurs. The waking period, the cyclical period according to which the waking period occurs, the total transmission time of the activation instruction, and the transmission interval between two consecutive instances of the activation instruction may be set adaptively according to the application scenario. For example, the waking period of each Bluetooth device in the Bluetooth mesh network system may be 30 ms, and the cyclical period according to which the waking period occurs may be 1 sec. Correspondingly, the transmission interval between two consecutive instances of the activation instruction may be 10 ms, and the total transmission time for the activation instruction may be 1.2 sec. In a period of 1.2 sec, it is possible to transmit the activation instruction a total of 120 times. This helps to ensure that the Bluetooth device successfully receives the activation instruction. The numerical values referred to here and the numerical magnitude relationships are merely illustrative and not restrictive.

In some embodiments, regardless of whether or not the Bluetooth gateway is able to use a communication trigger event as a basis to predetermine the destination Bluetooth device that it needs to communicate with, the Bluetooth gateway may include a broadcast address in the activation instruction and intermittently transmit the activation instruction in broadcast mode multiple times. Each Bluetooth device (including the destination Bluetooth device) in the Bluetooth mesh network system periodically enters a waking period, and while in the waking period, can receive an activation instruction transmitted by the Bluetooth gateway. If the Bluetooth device receives the activation instruction while in a waking period, it may determine that it is necessary to enter an activated state so that, while in the activated state, it would next receive communication data transmitted by the Bluetooth gateway. In such a situation, when each Bluetooth device receives communication data transmitted by the Bluetooth gateway, each Bluetooth device may determine whether it is the destination Bluetooth device based on the unicast address in the communication data. If the Bluetooth device determines that it is the destination Bluetooth device, it may then execute corresponding actions based on the communication data. If the Bluetooth device determines that it is not the destination Bluetooth device, it may discard the received communication data.

In some embodiments, if the Bluetooth gateway uses a communication trigger event as a basis to determine the destination Bluetooth device, the Bluetooth gateway may include the unicast address of the destination Bluetooth device in the activation instruction and intermittently transmit the activation instruction to the destination Bluetooth device multiple times. Each Bluetooth device (including the destination Bluetooth device) in the Bluetooth mesh network system periodically enters a waking period and receives the activation instruction transmitted by the Bluetooth gateway while in the waking period. If the Bluetooth device receives the activation instruction while in a waking period, it may determine whether it is the destination Bluetooth device based on the unicast address in the activation instruction. If the Bluetooth device determines that it is the destination Bluetooth device, it may determine that it needs to enter an activated state, and it may enter an activated state so as to receive communication data transmitted by the Bluetooth gateway. If the Bluetooth device determines that it is not the destination Bluetooth device, it may determine that it does not need to enter an activated state and may discard the activation instruction.

At 302b, communication data is transmitted to the destination Bluetooth device one time so that the destination Bluetooth device receives the communication data while in an activated state.

The activated state exists in relation to the dormant state and refers to being in a receiving state with a duty cycle of 100% for a period of time. The duration of the activated state may be set adaptively according to the application scenario. The current technique imposes no limits in this regard. For example, the duration of the activated state may be 10 sec, or it may be 15 sec, 8 sec, 30 sec, etc.

After transmitting the activation instruction, the Bluetooth gateway may transmit the communication data one time in accordance with the short continuous transmission mode to the destination Bluetooth device until the transmission ends so that the destination Bluetooth device receives the communication data while in an activated state. After the destination Bluetooth device enters an activated state, it may receive the communication data transmitted by the Bluetooth gateway. After the activated state ends, the destination Bluetooth device may re-enter a dormant state and periodically enter a waking period in order to wait for the next communication.

In some embodiments, the Bluetooth gateway obtains communication data during the period when it transmits the activation instruction. This provides the necessary conditions for transmission of the communication data. For example, the user may cause a single-wire power switch to turn on or off, or a user may cause an infrared remote control to change channels. Therefore, after issuing a wake-up instruction or a communication instruction, the user may next issue a control instruction to the Bluetooth gateway for the purpose of controlling the destination Bluetooth device. The control instruction may be a speech control instruction (or another type). The Bluetooth gateway may receive a control instruction for controlling the destination Bluetooth device during the period when it transmits the activation instruction. Then it may convert the control instruction into communication data. The "converts" mentioned here refers to the conversion of data formats and data types.

Figure 4A:
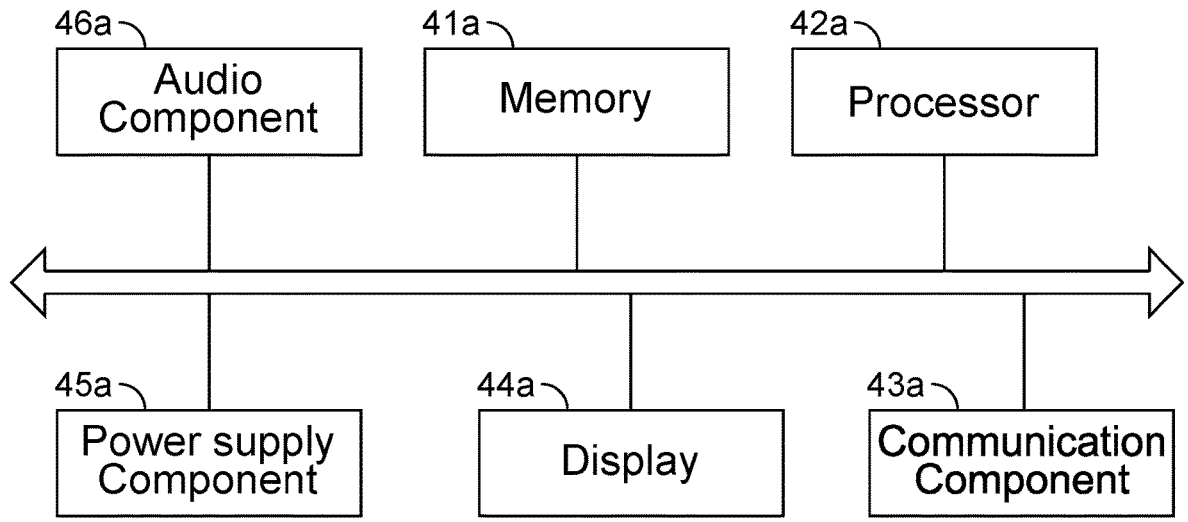
FIG. 4a is a diagram illustrating an example of a Bluetooth gateway.

FIG. 4a is a diagram illustrating an example of a Bluetooth gateway. As shown in FIG. 4a, the Bluetooth gateway includes memory 41a, a processor 42a, and a communication component 43a. The Bluetooth gateway of FIG. 4a is configured to implement the process of FIG. 1b.

Memory 41a stores computer programs and may be configured to store other kinds of data to support operations on Bluetooth gateways. Examples of this data include the instructions of any application program or method used in Bluetooth gateway operations, contact data, telephone directory data, messages, pictures, and video.

Processor 42a, which is coupled to memory 41a, executes computer programs in the memory 41a, e.g., for: intermittently transmitting a preparation instruction multiple times via communication component 43a in response to a communication trigger event to take advantage of a waking period periodically occurring in a destination Bluetooth device so as to notify the destination Bluetooth device of the need to prepare to receive communication data; determining a data transmission mode adapted to the destination Bluetooth device according to a communication capability of the destination Bluetooth device; and transmitting communication data via communication component 43a in accordance with the data transmission mode adapted to the destination Bluetooth device so that the destination Bluetooth device receives the communication data.

In some embodiments, processor 42a, when intermittently transmitting a preparation instruction multiple times, performs processing associated with the following: in response to a wake-up instruction for the Bluetooth gateway, the Bluetooth gateway intermittently transmitting a preparation instruction multiple times after it is woken up; or intermittently transmitting a preparation instruction multiple times in response to a communication instruction issued by a user; or intermittently transmitting a preparation instruction multiple times in response to a cyclical communication event.

In some embodiments, processor 42a obtains communication data during the period when communication component 43a transmits a preparation instruction. In some embodiments, processor 42a receives, via communication component 43a during the period when communication component 43a transmits the preparation instruction, a control instruction for controlling the destination Bluetooth device and converting the control instruction into communication data.

In some embodiments, processor 42a, when determining the data transmission mode adapted to the destination Bluetooth device (if the destination Bluetooth device is a first-type Bluetooth device), determines that the data transmission mode adapted to the destination Bluetooth device is an intermittently repeating transmission mode (wherein the first-type Bluetooth device is a device whose receiving time for the maximum data volume in a single communication process is less than the waking period). Correspondingly, processor 42a, when transmitting communication data in accordance with the data transmission mode adapted to the destination Bluetooth device, may intermittently transmit the communication data to the destination Bluetooth device multiple times so that the destination Bluetooth device receives the communication data during a waking period that periodically occurs.

In some embodiments, processor 42a, when determining the data transmission mode adapted to the destination Bluetooth device (if the destination Bluetooth device is a second-type Bluetooth device), determines that the data transmission mode adapted to the destination Bluetooth device is a short continuous transmission mode (wherein the second-type Bluetooth device is a device whose receiving time for the maximum data volume in a single communication process is greater than or equal to the waking period). Correspondingly, processor 42a, when transmitting communication data in accordance with the data transmission mode adapted to the destination Bluetooth device, may transmit the communication data one time to the destination Bluetooth device so that the destination Bluetooth device receives the communication data while in an activated state (the destination Bluetooth device having entered the activated state according to an activation instruction).

The total transmission time of the preparation instruction may be greater than the cyclical period according to which the waking period occurs and the transmission interval between two consecutive instances of the preparation instruction may be less than the waking period. The transmission interval between two consecutive instances of the preparation instruction may be 10 ms, the waking period may be 30 ms, the waking period cyclical length may be 1 sec, and the total transmission time of the preparation instruction may be 1.2 sec.

In the example shown in FIG. 4a, the Bluetooth gateway also includes display 44a, power supply component 45a, and audio component 46a. The Bluetooth gateway of FIG. 4a may also include other components not shown. In some embodiments, a computer-readable medium storing computer programs is included. When executed, the computer programs are capable of implementing all the steps executable by a Bluetooth gateway described herein (e.g., in FIGS. 1b and 1e).

Figure 4B:
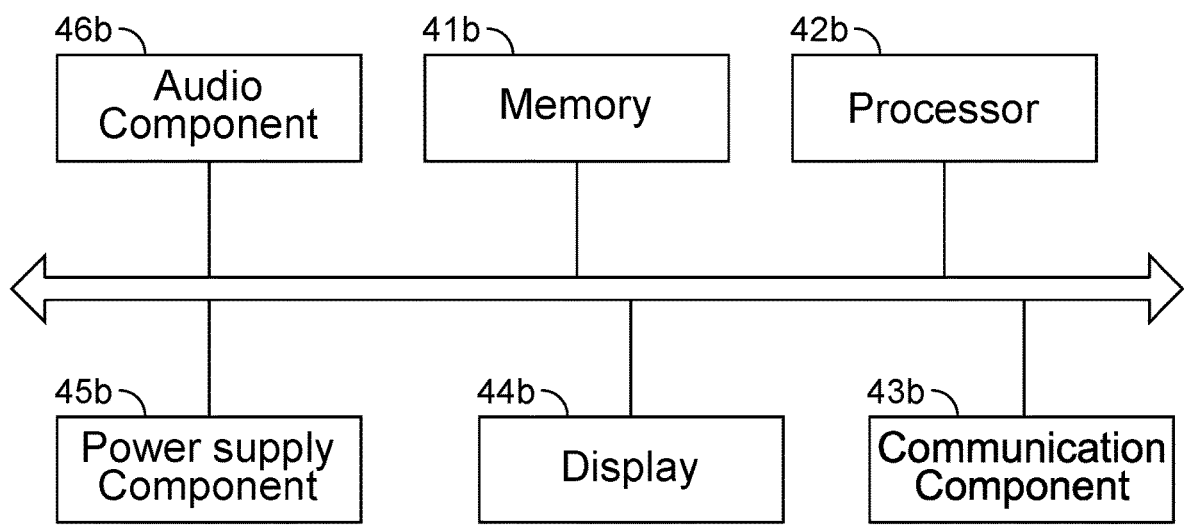
FIG. 4b is a diagram illustrating an example of a Bluetooth device.

FIG. 4b is a diagram illustrating an example of a Bluetooth device. As shown in FIG. 4b, the Bluetooth device includes memory 41b, processor 42b, and communication component 43b. The Bluetooth device of FIG. 4b is configured to implement the processes of FIGS. 1c and 1d.

Memory 41b stores computer programs and may be configured to store other kinds of data to support operations on Bluetooth devices. Examples of this data include the instructions of any application program or method used in Bluetooth device operations, contact data, telephone directory data, messages, pictures, and video.

Processor 42b, which is coupled to memory 41b, executes computer programs in memory 41b, e.g., for: periodically entering a waking period so as to receive via communication component 43b a preparation instruction or activation instruction transmitted by a Bluetooth gateway during the waking period; entering an activated state upon receiving an activation instruction during the waking period and determining that it is necessary to enter an activated state; and receiving, via communication component 43b, communication data transmitted by the Bluetooth gateway while in an activated state.

In some embodiments, processor 42b, when determining that it needs to enter an activated state, determines that it needs to enter an activated state if the activation instruction carries a unicast address and the Bluetooth device's unicast address is the same as the unicast address in the activation instruction.

In the example shown in FIG. 4b, the Bluetooth device also includes display 44b, power supply component 45b, and audio component 46b. The Bluetooth device of FIG. 4b may also include other components not shown. In some embodiments, a computer-readable medium storing computer programs is included. When executed, the computer programs are capable of implementing all the steps executable by a Bluetooth device described herein.

Figure 5A:
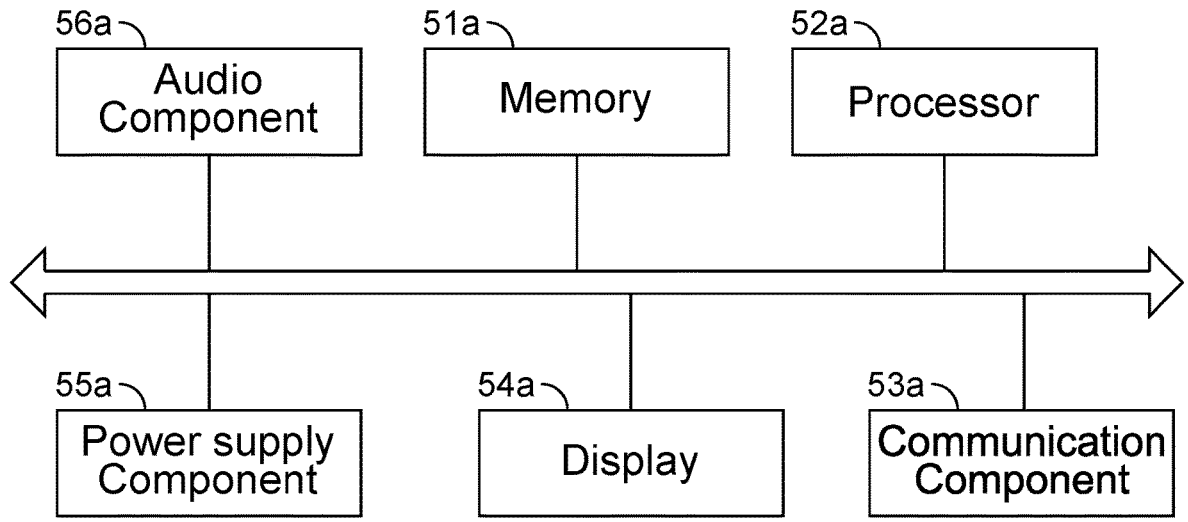
FIG. 5a is another diagram illustrating an example of a Bluetooth gateway.

FIG. 5a is another diagram illustrating an example of a Bluetooth gateway. As shown in FIG. 5a, the Bluetooth gateway includes memory 51a, processor 52a, and communication component 53a. The Bluetooth gateway of FIG. 5a is configured to implement the process of FIG. 3b.

Memory 51a stores computer programs and may be configured to store other kinds of data to support operations on Bluetooth gateways. Examples of this data include the instructions of any application program or method used in Bluetooth gateway operations, contact data, telephone directory data, messages, pictures, and video.

Processor 52a, which is coupled to memory 51a, executes computer programs in memory 51a, e.g., for intermittently transmitting an activation instruction via communication component 53a multiple times in response to a communication trigger event to take advantage of a waking period periodically occurring in a destination Bluetooth device to activate the destination Bluetooth device and transmitting communication data via communication component 53a to the destination Bluetooth device one time so that the destination Bluetooth device receives the communication data while in an activated state.

In some embodiments, processor 52a, when intermittently transmitting an activation instruction multiple times (in response to a wake-up instruction for the Bluetooth gateway), causes the Bluetooth gateway to intermittently transmit an activation instruction multiple times after it is woken up; or intermittently transmit an activation instruction multiple times in response to a communication instruction issued by a user; or intermittently transmit an activation instruction multiple times in response to a cyclical communication event.

In some embodiments, processor 52a also allows for obtaining communication data during the period when communication component 53a transmits an activation instruction. In some embodiments, processor 52a receives, via communication component 53a during the period when communication component 53a transmits the activation instruction, a control instruction for controlling the destination Bluetooth device and converting the control instruction into communication data.

The total transmission time of the activation instruction may be greater than the cyclical period according to which the waking period occurs and the transmission interval between two consecutive instances of the activation instruction may be less than the waking period. The transmission interval between two consecutive instances of the activation instruction may be 10 ms, the waking period may be 30 ms, the waking period cyclical occurrence length may be 1 sec, and the total transmission time of the activation instruction may be 1.2 sec.

As shown in FIG. 5a, the Bluetooth gateway also includes display 54a, power supply component 55a, and audio component 56a. The Bluetooth gateway of FIG. 5a may also include other components not shown. A computer-readable medium storing computer programs may also be included. When executed, the computer programs are capable of implementing all the steps executable by a Bluetooth gateway described herein (e.g., in FIGS. 3a and 3b).

Figure 5B:
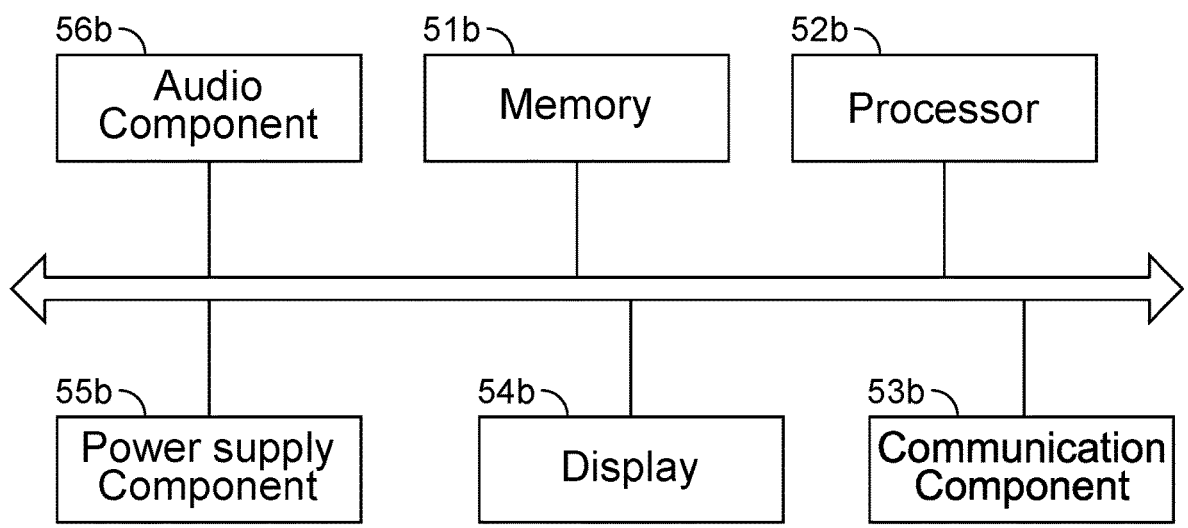
FIG. 5b is one more diagram illustrating an example of a Bluetooth gateway.

FIG. 5b is one more diagram illustrating an example of a Bluetooth gateway. As shown in FIG. 5b, the Bluetooth gateway includes memory 51b, processor 52b, and communication component 53b. The Bluetooth gateway of FIG. 5b is configured to implement the process of FIG. 2b.

Memory 51b stores computer programs and may be configured to store other kinds of data to support operations on Bluetooth gateways. Examples of this data include the instructions of any application program or method used in Bluetooth gateway operations, contact data, telephone directory data, messages, pictures, and video.

Processor 52b, which coupled to memory 51b, executes computer programs in memory 51b, e.g., for acquiring communication data in response to a communication trigger event and intermittently transmitting communication data via communication component 53b to the destination Bluetooth device multiple times so that the destination Bluetooth device receives the communication data during a waking period that periodically occurs.

In some embodiments, processor 52b, when acquiring communication data, wakes up a Bluetooth gateway in response to a wake-up instruction issued for the Bluetooth gateway, and after the Bluetooth gateway is awake, receives a control instruction to control the destination Bluetooth device and converts the control instruction into communication data.

To ensure that the communication data can be received by the destination Bluetooth device, the total transmission time for the communication data needs to be greater than the cyclical period according to which the waking period occurs, and the transmission interval between two consecutive instances of communication data needs to be less than the waking period. For example, the total transmission time for the communication data may be 1.2 times the cyclical period according to which the waking period occurs. The waking period, the cyclical period according to which the waking period occurs, the total transmission time of the communication data, and the transmission interval between two consecutive instances of communication data may be set adaptively according to the application scenario. In some embodiments, the waking period of each Bluetooth device in the Bluetooth mesh network system is 30 ms, and the cyclical period according to which the waking period occurs is 1 sec. The transmission interval between two consecutive instances of the communication data may be 10 ms, and the total transmission time for the communication data may be 1.2 sec. In a period of 1.2 sec, it is possible to transmit the communication data a total of 120 times. This helps to ensure that the Bluetooth device successfully receives the communication data. The numerical values referred to here and the numerical magnitude relationships are merely illustrative and not restrictive.

Furthermore, as shown in FIG. 5b, the Bluetooth gateway also includes display 54b, power supply component 55b, and audio component 56b. The Bluetooth gateway in FIG. 5b may also include other components not shown. A computer-readable medium storing computer programs may also be included. When executed, the computer programs are capable of implementing all the steps executable by a Bluetooth gateway described herein (e.g., in FIGS. 2a and 2b).

The memory in FIGS. 4a through 5b may be any type of volatile or non-volatile storage device or combination thereof, such as static random access memory (SRAM), electrically erasable programmable read-only memory (EEPROM), erasable programmable read-only memory (EPROM), programmable read-only memory (PROM), read-only memory (ROM), magnetic storage, flash memory, magnetic disks, or optical disks.

The communication component in FIGS. 4a through 5b described above is configured to facilitate wired or wireless communication between the device where the communication component is located and other devices. The device where the communication component is located may access wireless networks based on a communications standard such as WiFi, 2G, 3G, 4G, 5G, or a combination thereof. The communication component may receive via broadcast channels broadcast signals or broadcast-related information from external broadcast management systems. The communication component may include a near-field communication (NFC) module for promoting short-range communication. For example, short-range communication can be achieved in the NFC module on the basis of radio-frequency identification (RFID) technology, Infrared Data Association (IrDA) technology, ultra-wide band (UWB) technology, Bluetooth (BT) technology, and other technology.

The display in FIGS. 4a through 5b includes a screen that may include a liquid crystal display (LCD) and a touch panel (TP). If the screen includes a touch panel, the screen may be implemented as a touchscreen to receive input signals from the user. The touch panel may include one or more touch sensors to detect touch, sliding actions, and gestures on the touch panel. The touch sensor can not only detect the boundaries of touch or slide actions, but also can measure duration and pressure related to touch or slide operations.

The power supply component in FIGS. 4a through 5b provides electric power to the various components of the device where the power supply component is located. The power supply may include a power supply management system, one or more power supplies, and other components related to generating, managing, and allocating power to the device where the power supply component is located.

The audio component in FIGS. 4a through 5b may be configured to output and/or input audio signals. For example, the audio component may include a microphone (MIC). When the device where the audio component is located is in an operating mode, e.g., when in calling mode, recording mode, or speech determination mode, the microphone is configured to receive external audio signals. The received audio signals may be further stored in memory or sent by the communication component. In some embodiments, the audio component also includes a speaker for output of audio signals.

Figure 6:
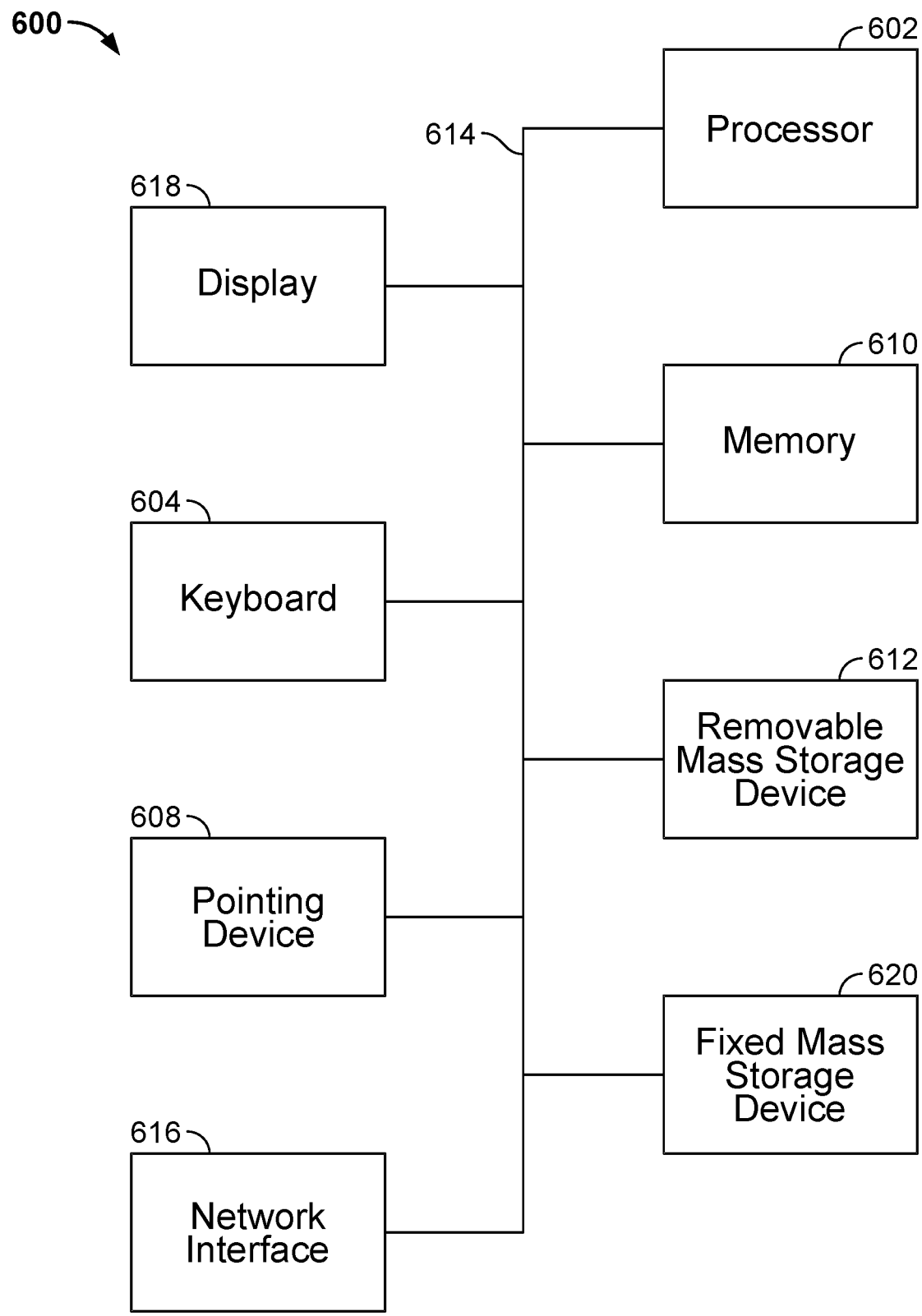
FIG. 6 is a functional diagram illustrating an embodiment of a programmed computer system.

FIG. 6 is a functional diagram illustrating an embodiment of a programmed computer system. In some embodiments, the programmed computer system of FIG. 6 implements Bluetooth gateway 10a in the Bluetooth mesh network system of FIG. 1a. In some embodiments, the programmed computer system of FIG. 6 implements the process of FIG. 1b. In some embodiments, the programmed computer system of FIG. 6 implements the steps shown in FIG. 1e. In some embodiments, the programmed computer system of FIG. 6 implements Bluetooth gateway 20a in the Bluetooth mesh network system of FIG. 2a. In some embodiments, the programmed computer system of FIG. 6 implements the process of FIG. 2b. In some embodiments, the programmed computer system of FIG. 6 implements Bluetooth gateway 30a in the Bluetooth mesh network system of FIG. 3a. In some embodiments, the programmed computer system of FIG. 6 implements the process of FIG. 3b. In some embodiments, the programmed computer system of FIG. 6 implements the modules of FIG. 4a, FIG. 5a, and/or FIG. 5b.

As will be apparent, other computer system architectures and configurations can also be used. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general-purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage area, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600 and is coupled either bi-directionally (read/write) or uni-directionally (read only) to processor 602. For example, storage 612 can also include computer readable media such as magnetic tape, flash memory, PC-CARDS, portable mass storage devices, holographic storage devices, and other storage devices. A fixed mass storage 620 can also, for example, provide additional data storage capacity. The most common example of fixed mass storage 620 is a hard disk drive. Mass storages 612, 620 generally store additional programming instructions, data, and the like that typically are not in active use by the processor 602. It will be appreciated that the information retained within mass storages 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display 618, a network interface 616, a keyboard 604, and a pointing device 608, as well as an auxiliary input/output device interface, a sound card, speakers, and other subsystems as needed. For example, the pointing device 608 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

In some embodiments, computing equipment comprises one or more processors (CPUs), input/output interfaces, network interfaces, and memory. Memory may include such forms as volatile storage devices in computer-readable media, random access memory (RAM) and/or non-volatile memory, such as read-only memory (ROM) or flash memory (flash RAM). Memory is an example of a computer-readable medium.

A person skilled in the art should understand that the embodiments of the present invention can be provided as methods, systems or computer software products. Therefore, the present invention may take the form of complete hardware embodiments, complete software embodiments, or embodiments that combine software and hardware. Moreover, the present invention may take the form of computer program products implemented on one or more computer-operable storage media (including but not limited to magnetic disk storage, CD-ROMs, and optical storage) containing computer-operable program code.

The present invention is described with reference to flow charts and/or block diagrams based on methods, equipment (systems) and computer program products of the present invention. Please note that each process flow and/or block within the flowcharts and/or block diagrams and combinations of process flows and/or blocks within the flowcharts and/or block diagrams can be implemented by computer instructions. These computer program instructions can be provided to general-purpose computers, special-purpose computers, embedded processors, or processors of other data-processing devices to give rise to a machine such that the instructions by the computers or by the processors of other programmable data-processing devices give rise to devices used to implement the functions specified in one or more processes in a flowchart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command means. These command means implement the functions specified in one or more processes in a flow chart and/or one or more blocks in a block diagram.

These computer program instructions can also be loaded onto a computer or other programmable data-processing device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

In a typical configuration, a computer device comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. Information may be computer-readable instructions, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. In accordance with the definitions in this document, computer-readable media do not include transitory computer-readable media (transitory media) such as modulated data signals and carrier waves.

Please also note that the terms "comprises" or "contains" or any of their variants are to be taken in their non-exclusive sense. Thus, processes, methods, merchandise, or devices that comprise a series of elements not only comprise those elements, but also comprise other elements that have not been explicitly listed or elements that are intrinsic to such processes, methods, merchandise, or devices. In the absence of further limitations, elements that are limited by the phrase "comprises a(n) . . . " do not exclude the existence of additional identical elements in processes, methods, merchandise, or devices that comprise said elements.

The above-stated are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A Bluetooth mesh network gateway, comprising:
a processor; and
a memory coupled with the processor, wherein the memory is configured to provide the processor with instructions which when executed cause the processor to:
receive a wake-up instruction associated with an action of a user;
transmit a preparation instruction that is receivable by a Bluetooth device during a waking period of the Bluetooth device, wherein:
the waking period of the Bluetooth device occurs cyclically with a specified cycle length,
the waking period of the Bluetooth device has a time length that is a predetermined value,
the preparation instruction is able to be transmitted repeatedly to the Bluetooth device for a duration at least as long as the specified cycle length, and
the preparation instruction indicates to the Bluetooth device that a communication data is forthcoming to the Bluetooth device and that the Bluetooth device should enter an activated state to receive the communication data;
receive the communication data from the user;
determine whether a length of time needed to transmit the communication data is greater than the predetermined value; and
in response to a determination that the length of time needed to transmit the communication data is greater than the predetermined value, transmit the communication data to the Bluetooth device as a continuous, one-time transmission while the Bluetooth device is in the activated state.

2. The Bluetooth mesh network gateway of claim 1, wherein the preparation instruction is continuously transmitted for a length of time that is at least as long as the specified cycle length.

3. The Bluetooth mesh network gateway of claim 1, wherein in response to a determination that the length of time needed to transmit the communication data is less than the predetermined value, a repeating data transmission mode is selected.

4. The Bluetooth mesh network gateway of claim 3, wherein the repeating data transmission mode corresponds to repeatedly transmitting the communication data to the Bluetooth device for a length of time that is at least as long as the specified cycle length.

5. The Bluetooth mesh network gateway of claim 1, wherein in response to a determination that the length of time needed to transmit the communication data is greater than or equal to the predetermined value, a non-repeating data transmission mode is selected.

6. The Bluetooth mesh network gateway of claim 5, wherein the non-repeating data transmission mode corresponds to transmitting the communication data once to the Bluetooth device while the Bluetooth device is in an activated state that lasts at least as long as the length of time needed to transmit the communication data.

7. The Bluetooth mesh network gateway of claim 1, wherein the communication data includes a control instruction directed at the Bluetooth device.

8. The Bluetooth mesh network gateway of claim 7, wherein the control instruction includes a powering on or powering off instruction.

9. The Bluetooth mesh network gateway of claim 1, wherein the preparation instruction is transmitted upon detection of an event that triggers communication with the Bluetooth device.

10. The Bluetooth mesh network gateway of claim 9, wherein the event is a user-issued command to the Bluetooth device.

11. The Bluetooth mesh network gateway of claim 10, wherein the user-issued command is a voice command.

12. The Bluetooth mesh network gateway of claim 9, wherein the event is an automatically generated reminder to communicate with the Bluetooth device.

13. The Bluetooth mesh network gateway of claim 1, wherein at least a portion of the communication data is prepared for transmission while the preparation instruction is being transmitted.

14. The Bluetooth mesh network gateway of claim 1, wherein the Bluetooth device includes a power switch.

15. The Bluetooth mesh network gateway of claim 1, wherein the Bluetooth device includes a remote control.

16. The Bluetooth mesh network gateway of claim 1, wherein the preparation instruction or the communication data is broadcasted to a plurality of Bluetooth devices.

17. The Bluetooth mesh network gateway of claim 1, wherein the preparation instruction or the communication data is unicasted to a single Bluetooth device.

18. The Bluetooth mesh network gateway of claim 1, wherein the specified cycle length covers the waking period and a non-waking period during which the Bluetooth device is not able to receive the preparation instruction or the communication data.

19. A method, comprising:
  receiving a wake-up instruction associated with an action of a user;
  transmitting a preparation instruction that is receivable by a Bluetooth device during a waking period of the Bluetooth device, wherein:
    the waking period of the Bluetooth device occurs cyclically with a specified cycle length,
    the waking period of the Bluetooth device has a time length that is a predetermined value,
    the preparation instruction is able to be transmitted repeatedly to the Bluetooth device for a duration at least as long as the specified cycle length, and
    the preparation instruction indicates to the Bluetooth device that a communication data is forthcoming to the Bluetooth device and that the Bluetooth device should enter an activated state to receive the communication data;
  determining whether a length of time needed to transmit the communication data is greater than the predetermined value; and
  in response to a determination that the length of time needed to transmit the communication data is greater than the predetermined value, transmitting the communication data to the Bluetooth device as a continuous, one-time transmission while the Bluetooth device is in the activated state.

20. A computer program product, the computer program product being embodied in a non-transitory computer readable storage medium and comprising computer instructions for:
  receiving a wake-up instruction associated with an action of a user;
  transmitting a preparation instruction that is receivable by a Bluetooth device during a waking period of the Bluetooth device, wherein:
    the waking period of the Bluetooth device occurs cyclically with a specified cycle length,
    the waking period of the Bluetooth device has a time length that is a predetermined value,
    the preparation instruction is able to be transmitted repeatedly to the Bluetooth device for a duration at least as long as the specified cycle length, and
    the preparation instruction indicates to the Bluetooth device that a communication data is forthcoming to the Bluetooth device and that the Bluetooth device should enter an activated state to receive the communication data;
  determining whether a length of time needed to transmit the communication data is greater than the predetermined value; and
  in response to a determination that the length of time needed to transmit the communication data is greater than the predetermined value, transmitting the communication data to the Bluetooth device as a continuous, one-time transmission while the Bluetooth device is in the activated state.

* * * * *

UNITED STATES PATENT AND TRADEMARK OFFICE
CERTIFICATE OF CORRECTION

PATENT NO. : 10,986,573 B2  
APPLICATION NO. : 16/440516  
DATED : April 20, 2021  
INVENTOR(S) : Junfeng Hu Page 1 of 1

It is certified that error appears in the above-identified patent and that said Letters Patent is hereby corrected as shown below:

On the Title Page

Item (73), assignee, address, insert --Cayman Islands (KY)--.

Column 2, Below Item (56) other publications, delete "Brinivasa R Reddivalam" and insert --Srinivasa R Reddivalam--, therefor.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*